(12) United States Patent
Low et al.

(10) Patent No.: US 11,031,864 B2
(45) Date of Patent: Jun. 8, 2021

(54) CHARGE PUMP STABILITY CONTROL

(71) Applicant: pSemi Corporation, San Diego, CA (US)

(72) Inventors: Aichen Low, Cambridge, MA (US); Gregory Szczeszynski, Hollis, NH (US); David Giuliano, Bedford, NH (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 16/658,570

(22) Filed: Oct. 21, 2019

(65) Prior Publication Data

US 2020/0195135 A1  Jun. 18, 2020

Related U.S. Application Data

(63) Continuation of application No. 16/037,362, filed on Jul. 17, 2018, now Pat. No. 10,454,368, which is a
(Continued)

(51) Int. Cl.
*H02M 3/07* (2006.01)

(52) U.S. Cl.
CPC .............. *H02M 3/07* (2013.01); *H02M 3/073* (2013.01)

(58) Field of Classification Search
CPC .................................. H02M 3/07; H02M 3/073
(Continued)

(56) References Cited

U.S. PATENT DOCUMENTS

| 4,214,174 A | 7/1980 | Dickson |
| 4,812,961 A | 3/1989 | Essaff et al. |

(Continued)

FOREIGN PATENT DOCUMENTS

| CN | 1057410 | 10/2000 |
| CN | 1728518 | 2/2006 |

(Continued)

OTHER PUBLICATIONS

Abutbul et al. "Step-Up Switching-Mode Converter With High Voltage Gain Using a Switched-Capacitor Circuit" *IEEE Transactions on Circuits and Systems I.*, vol. 50, pp. 1098-1102, Aug. 2003.
(Continued)

*Primary Examiner* — Gary A Nash
(74) *Attorney, Agent, or Firm* — Berkeley Law & Technology Group, LLP

(57) ABSTRACT

An apparatus for power conversion includes a switching network that controls interconnections between pump capacitors in a capacitor network that has a terminal coupled to a current source, and a charge-management subsystem. In operation, the switching network causes the capacitor network to execute charge-pump operating cycles during each of which the capacitor network adopts different configurations in response to different configurations of the switching network. At the start of a first charge-pump operating cycle, each pump capacitor assumes a corresponding initial state. The charge-management subsystem restores each pump capacitor to the initial state by the start of a second charge-pump operating cycle that follows the first charge-pump operating cycle.

20 Claims, 12 Drawing Sheets

Related U.S. Application Data continuation of application No. 15/850,117, filed on Dec. 21, 2017, now Pat. No. 10,027,224, which is a continuation of application No. 15/126,073, filed as application No. PCT/US2015/019860 on Mar. 11, 2015, now Pat. No. 9,887,622.

(60) Provisional application No. 61/953,303, filed on Mar. 14, 2014, provisional application No. 61/953,270, filed on Mar. 14, 2014.

(58) Field of Classification Search
USPC .............. 323/242, 288; 327/536; 363/59, 60
See application file for complete search history.

(56) References Cited

U.S. PATENT DOCUMENTS

| | | |
|---|---|---|
| 5,132,606 A | 7/1992 | Herbert |
| 5,132,895 A | 7/1992 | Kase |
| 5,301,097 A | 4/1994 | McDaniel |
| 5,737,201 A | 4/1998 | Meynard et al. |
| 5,761,058 A | 6/1998 | Kanda et al. |
| 5,801,987 A | 9/1998 | Dinh |
| 5,907,484 A | 5/1999 | Kowshik et al. |
| 5,978,283 A | 11/1999 | Hsu et al. |
| 6,021,056 A | 2/2000 | Forbes |
| 6,107,864 A | 8/2000 | Fukushima et al. |
| 6,476,666 B1 | 11/2002 | Palusa et al. |
| 6,486,728 B2 | 11/2002 | Kleveland |
| 6,501,325 B1 | 12/2002 | Meng |
| 6,504,422 B1 | 1/2003 | Rader |
| 6,759,766 B2 | 7/2004 | Hiratsuka et al. |
| 6,927,441 B2 | 8/2005 | Pappalardo et al. |
| 6,980,181 B2 | 12/2005 | Sudo |
| 7,135,847 B2 | 11/2006 | Taurand |
| 7,145,382 B2* | 12/2006 | Ker ...................... H02M 3/073 327/536 |
| 7,190,210 B2 | 3/2007 | Azrai et al. |
| 7,224,062 B2 | 5/2007 | Hsu |
| 7,239,194 B2 | 7/2007 | Azrai et al. |
| 7,250,810 B1 | 7/2007 | Tsen |
| 7,408,330 B2 | 8/2008 | Zhao |
| 7,511,978 B2 | 3/2009 | Chen et al. |
| 7,595,682 B2 | 9/2009 | Lin et al. |
| 7,724,551 B2 | 5/2010 | Yanagida |
| 7,777,459 B2 | 8/2010 | Williams |
| 7,782,027 B2 | 8/2010 | Williams |
| 7,786,712 B2 | 8/2010 | Williams |
| 7,807,499 B2 | 10/2010 | Nishizawa |
| 7,812,579 B2 | 10/2010 | Williams |
| 7,928,705 B2 | 4/2011 | Hooijschuur et al. |
| 7,999,601 B2 | 8/2011 | Schlueter et al. |
| 8,018,216 B2 | 9/2011 | Kakehi |
| 8,040,174 B2 | 10/2011 | Likhterov |
| 8,048,766 B2 | 11/2011 | Joly et al. |
| 8,111,054 B2 | 2/2012 | Yen et al. |
| 8,159,091 B2* | 4/2012 | Yeates ..................... H02M 3/07 307/110 |
| 8,193,604 B2 | 6/2012 | Lin et al. |
| 8,212,541 B2 | 7/2012 | Perreault et al. |
| 8,339,184 B2 | 12/2012 | Kok et al. |
| 8,350,549 B2 | 1/2013 | Kitabatake |
| 8,354,828 B2 | 1/2013 | Huang et al. |
| 8,384,467 B1 | 2/2013 | O'Keeffe et al. |
| 8,395,914 B2 | 3/2013 | Klootwijk et al. |
| 8,456,874 B2 | 6/2013 | Singer et al. |
| 8,503,203 B1 | 8/2013 | Szczeszynski et al. |
| 8,643,347 B2 | 2/2014 | Giuliano et al. |
| 8,723,491 B2 | 5/2014 | Giuliano |
| 8,803,492 B2 | 8/2014 | Liu |
| 9,887,622 B2 | 2/2018 | Low |
| 10,027,224 B2 | 7/2018 | Low |
| 2002/0008567 A1 | 1/2002 | Henry |
| 2003/0169096 A1 | 9/2003 | Hsu et al. |
| 2003/0227280 A1 | 12/2003 | Vinciarelli |
| 2004/0041620 A1 | 3/2004 | D'Angelo et al. |
| 2005/0007184 A1 | 1/2005 | Kamijo |
| 2005/0207133 A1 | 9/2005 | Pavier et al. |
| 2007/0210774 A1 | 9/2007 | Kimura et al. |
| 2007/0230221 A1 | 10/2007 | Lim et al. |
| 2008/0150621 A1* | 6/2008 | Lesso ...................... H02M 3/07 327/536 |
| 2008/0157732 A1 | 7/2008 | Williams |
| 2008/0157733 A1 | 7/2008 | Williams |
| 2008/0158915 A1 | 7/2008 | Williams |
| 2008/0239772 A1 | 10/2008 | Oraw et al. |
| 2008/0284398 A1 | 11/2008 | Qiu |
| 2009/0059630 A1 | 3/2009 | Williams |
| 2009/0102439 A1 | 4/2009 | Williams |
| 2009/0174383 A1 | 7/2009 | Tsui et al. |
| 2009/0257211 A1 | 10/2009 | Kontani et al. |
| 2009/0278520 A1 | 11/2009 | Perreault et al. |
| 2010/0110741 A1 | 5/2010 | Lin et al. |
| 2010/0140736 A1 | 6/2010 | Lin et al. |
| 2010/0202161 A1 | 8/2010 | Sims et al. |
| 2010/0214746 A1 | 8/2010 | Lotfi et al. |
| 2010/0244189 A1 | 9/2010 | Klootwijk et al. |
| 2010/0244585 A1 | 9/2010 | Tan et al. |
| 2011/0026275 A1 | 2/2011 | Huang et al. |
| 2011/0163414 A1 | 7/2011 | Lin et al. |
| 2011/0204858 A1 | 8/2011 | Kudo |
| 2012/0119718 A1 | 5/2012 | Song |
| 2012/0139515 A1 | 6/2012 | Li |
| 2012/0146177 A1 | 6/2012 | Choi et al. |
| 2012/0146451 A1* | 6/2012 | Nitta .................... B41J 2/04541 310/300 |
| 2012/0153907 A1 | 6/2012 | Carobolante et al. |
| 2012/0154023 A1 | 6/2012 | Pan |
| 2012/0313602 A1 | 12/2012 | Perreault et al. |
| 2012/0326684 A1 | 12/2012 | Perreault et al. |
| 2013/0049714 A1 | 2/2013 | Chiu |
| 2013/0069614 A1 | 3/2013 | Tso et al. |
| 2013/0094157 A1 | 4/2013 | Giuliano |
| 2013/0154600 A1 | 6/2013 | Giuliano |
| 2013/0229841 A1 | 9/2013 | Giuliano |
| 2014/0159681 A1 | 6/2014 | Oraw et al. |
| 2017/0170723 A1 | 6/2017 | Low |
| 2018/0166987 A1 | 6/2018 | Low |
| 2018/0323706 A1 | 11/2018 | Low |
| 2020/0195135 A1 | 6/2020 | Low |

FOREIGN PATENT DOCUMENTS

| | | |
|---|---|---|
| CN | 1825485 | 8/2006 |
| CN | 101174789 | 5/2008 |
| CN | 101447753 | 6/2009 |
| CN | 101765963 | 6/2010 |
| CN | 106165279 | 11/2016 |
| CN | 106165279 | 5/2019 |
| CN | 110224588 | 9/2019 |
| EP | 0773622 | 5/1997 |
| GB | 2538665 | 11/2016 |
| JP | 10327573 | 12/1998 |
| JP | 11235053 | 8/1999 |
| JP | 2006067783 | 3/2006 |
| JP | 2010045943 | 2/2010 |
| KR | 20110061121 | 6/2011 |
| TW | 201547171 | 12/2015 |
| WO | 2006093600 | 9/2006 |
| WO | WO2006093600 | 9/2006 |
| WO | 2009112900 | 9/2009 |
| WO | 2013059446 | 11/2012 |
| WO | 2013059446 | 4/2013 |
| WO | 2013096416 | 6/2013 |
| WO | WO2015138547 | 9/2015 |

OTHER PUBLICATIONS

Axelrod et al. "Single-switch single-stage switched-capacitor buck converter", *Proc. of NORPIE 2004, 4th Nordic Workshop on Power and Industrial Electronics*, Jun. 2004.

(56) References Cited

OTHER PUBLICATIONS

Cervera et al. "A High Efficiency Resonant Switched Capacitor Converter with Continuous Conversion Ratio," Energy Conversion Congress and Exposition (ECCE), Sep. 2013, pp. 4969-4976.
Han et al. "A New Approach to Reducing Output Ripple in Switched-Capacitor-Based Step-Down DC-DC Converters" *IEEE Transactions on Power Electronics*, vol. 21, No. 6, pp. 1548-1555 Nov. 2006.
Lei et al. "Analysis of Switched-capacitor DC-DC Converters in Soft-charging Operation" *14th IEEE Workshop on Control and Modeling for Power Electronics*, pp. 1-7, Jun. 23, 2013.
Linear Technology data sheet for part LTC3402, "2A, 3MHz Micropower Synchronous Boost Converter," 2000.
Ma et al, "Design and Optimization of Dynamic Power System for Self-Powered Integrated Wireless Sensing Nodes" ACM ISLPED '05 conference (published at pp. 303-306 of the proceedings).
Markowski, "Performance Limits of Switched-Capacitor DC-DC Converters", IEEE PESC'95 Conference, 1995.
Meynard et al. "Multi-Level Conversion: High Voltage Choppers and Voltage-Source Inverters," *IEEE Power Electronics Specialists Conference*, pp. 397-403, 1992.
Middlebrook, "Transformerless DC-to-DC Converters with Large Conversion Ratios" *IEEE Transactions on Power Electronics*, vol. 3, No. 4, pp. 484-488, Oct. 1988.
Ng et al. "Switched Capacitor DC-DC Converter: Superior where the Buck Converter has Dominated" *PhD Thesis, UC Berkeley*, Aug. 17, 2011.
Ottman et al, "Optimized Piezoelectric Energy Harvesting Circuit using Step-Down Converter in Discontinuous Conduction Mode," IEEE Power Electronics Specialists Conference, pp. 1988-1994, 2002.
Pilawa-Podgurski et al. "Merged Two-Stage Power Converter Architecture with Soft Charging Switched-Capacitor Energy Transfer" *39th IEEE Power Electronics Specialists Conference*, 2008.
Pilawa-Podgurski et al. "Merged Two-Stage Power Converter with Soft Charging Switched-Capacitor Stage in 180 nm CMOS," *IEEE Journal of Solid-State Circuits*, vol. 47, No. 7, pp. 15571567, Jul. 2012.
Starzyk et al., "A DC-DC Charge Pump Design Based on Voltage Doublers," IEEE Transactions on Circuits and Systems—I. Fundamental Theory and Applications, vol. 48, No. 3, Mar. 2001, pp. 350-359.
Sun et al. "High Power Density, High Efficiency System Two-Stage Power Architecture for Laptop Computers", *Power Electronics Specialists Conference*, pp. 1-7, Jun. 2006.
Texas Instruments data sheet for part TPS54310, "3-V to 6-V input, 3-A output synchronous-buck PWM switcher with integrated FETs", dated 2002-2005.
Umeno et al. "A New Approach to Low Ripple-Noise Switching Converters on the Basis of Switched-Capacitor Converters" *IEEE International Symposium on Circuits and Systems*, vol. 2, pp. 1077-1080, Jun. 1991.
Wood et al. "Design, Fabrication and Initial Results of a 2g Autonomous Glider" *IEEE Industrial Electronics Society*, pp. 1870-1877, Nov. 2005.
Xu et al., "Voltage Divider and its Application in Two-stage Power Architecture," IEEE Twenty-First Annual IEEE Applied Power Electronics Conference and Exposition, pp. 499-504, Mar. 2006.
U.S. Appl. No. 15/126,073: U.S. Patent Application and Application Data Sheet filed and Preliminary Amendment received dated Sep. 14, 2016, 63 pages.
U.S. Appl. No. 15/126,073: Power of Attorney, Request for Corrected Filing Receipt and Application Data Sheet filed dated Oct. 13, 2016, 7 pages.
U.S. Appl. No. 15/126,073: Filing Receipt and Notice of DO/EO Acceptance dated Mar. 10, 2017, 5 pages.
U.S. Appl. No. 15/126,073: Notice of Publication dated Jun. 15, 2017, 1 page.
U.S. Appl. No. 15/126,073: Power of Attorney, Request to change applicant name and Application Data Sheet filed Oct. 5, 2017, 7 pages.
U.S. Appl. No. 15/126,073: Corrected Filing Receipt dated Oct. 11, 2017, 3 pages.
U.S. Appl. No. 15/126,073: Notice of Allowance dated Nov. 6, 2017, 10 pages.
U.S. Appl. No. 15/126,073: Issue Fee Payment dated Dec. 18, 2017, 1 page.
U.S. Appl. No. 15/126,073: Issue Notification dated Jan. 17, 2018, 1 page.
U.S. Appl. No. 15/850,117: Patent Application, Power of Attorney and Application Data Sheet filed Dec. 21, 2017, 47 pages.
U.S. Appl. No. 15/850,117: Notice to File Missing Parts & Filing Receipt dated Jan. 18, 2018, 5 pages.
U.S. Appl. No. 15/850,117: Applicant Response to Pre-Exam Formalities Notice and Preliminary Amendment dated Mar. 19, 2018, 2 pages.
U.S. Appl. No. 15/850,117: Application Data Sheet and Request to change applicant name filed Feb. 28, 2018, 7 pages.
U.S. Appl. No. 15/850,117: Updated Filing Receipt dated Mar. 6, 2018, 3 pages.
U.S. Appl. No. 15/850,117: Application Data Sheet filed Apr. 24, 2018, 6 pages.
U.S. Appl. No. 15/850,117: Notice of Allowance dated May 10, 2018, 10 pages.
U.S. Appl. No. 15/850,117: Corrected Filing Receipt dated May 17, 2018, 3 pages.
U.S. Appl. No. 15/850,117: Notice of Publication dated Jun. 14, 2018, 1 page.
U.S. Appl. No. 15/850,117: Issue Fee Payment dated Jun. 18, 2018, 1 page.
U.S. Appl. No. 15/850,117: Issue Notification dated Jun. 27, 2018, 1 page.
U.S. Appl. No. 16/037,362: Patent Application and Application Data Sheet filed Jul. 17, 2018, 48 pages.
U.S. Appl. No. 16/037,362: Filing Receipt dated Aug. 1, 2018, 4 pages.
U.S. Appl. No. 16/037,362: Notice of Publication dated Nov. 8, 2018, 1 page.
U.S. Appl. No. 16/037,362: Non-Final Office Action dated Jan. 2, 2019, 9 pages.
U.S Appl. No. 16/037,362: Power of Attorney dated Jan. 4, 2019, 1 page.
U.S Appl. No. 16/037,362: Terminal Disclaimer review decision and Terminal Disclaimer Filed Apr. 2, 2019, 3 pages.
U.S Appl. No. 16/037,362: Notice of Allowance dated Apr. 19, 2019, 9 pages.
U.S Appl. No. 16/037,362: Issue Fee Payment and 312 Amendment dated Jul. 19, 2019, 2 pages.
U.S Appl. No. 16/037,362: 312 Amendment initiated by the examiner dated Aug. 22, 2019, 1 page.
U.S Appl. No. 16/037,362: Issue Notification dated Oct. 2, 2019, 1 page.
PCT/US2015/019860: Application Body as Filed dated Mar. 11, 2015, 49 pages.
PCT/US2015/019860: Invitation to Correct Defects in the International Application, Notification of the International Application No. and of the International Filing Date and Notification Concerning Payment of Prescribed Fees dated Mar. 18, 2015, 7 pages.
PCT/US2015/019860: Notification of Receipt of Search Copy dated Mar. 24, 2015, 1 page.
PCT/US2015/019860: Notification of receipt of record copy dated Mar. 31, 2015, 1 page.
PCT/US2015/019860: Notification Concerning Submission or Transmittal of Priority Document dated Apr. 1, 2015, 1 page.
PCT/US2015/019860: International Search Report & Written Opinion dated Jun. 19, 2015, 9 pages.
PCT/US2015/019860: Notification Concerning the Filing of Amendments of the Claims dated Aug. 19, 2015, 1 page.
PCT/US2015/019860: Notification Concerning Availability of Publication of the International Application dated Sep. 17, 2015, 1 page.

(56) References Cited

OTHER PUBLICATIONS

PCT/US2015/019860: Notice Informing the Applicant of the Communication of the International Application to the Designated Offices dated Oct. 15, 2015, 1 page.
PCT/US2015/019860: International Preliminary Report dated Jun. 15, 2016, 17 pages.
PCT/US2015/019860: Notice Informing the Applicant of the Communication of the International Application to the Designated Offices dated Jul. 14, 2016, 1 page.
PCT/US2015/019860: Notification of the Recording of a Change dated Sep. 7, 2016, 1 page.
CN 201580014388.3: Patent Application filed Mar. 11, 2015, 34 pages.
CN 201580014388.3: First Office Action dated May 3, 2018, 14 pages.
CN 201580014388.3: First Search dated Apr. 23, 2018, 2 pages.
CN 201580014388.3: Notification to Grant dated Jan. 22, 2019, 3 pages.
CN 201910277476: Patent Application filed Apr. 8, 2019, 32 pages.
CN 201910277476.2: First Office Action dated Nov. 2, 2020, 8 pages.
CN 201910277476.2: First Search dated Oct. 24, 2020, 2 pages.
CN 201910277476.2: Office Action dated Nov. 20, 2020, 13 pages.
DE 112015001260: Patent Application filed Sep. 14, 2016, 85 pages.
GB 1615324.9: Patent Application filed Sep. 8, 2016, 50 pages.
GB 1615324.9: Examination Report Under Section 18(3) dated Sep. 8, 2020, 2 pages.
KR 10-2016-7028577: Patent Application filed Oct. 14, 2016, 99 pages.
KR 10-2016-7028577: Request for Examination dated Feb. 13, 2020, 3 pages.
TW 104108083: Patent Application filed Mar. 13, 2015, 60 pages.

* cited by examiner

CHARGE PUMP STABILITY CONTROL

RELATED APPLICATIONS

Under 35 USC 120 this application is a continuation of U.S. application Ser. No. 16/037,362, filed on Jul. 17, 2018, now U.S. Pat. No. 10,454,368, issued on Oct. 22, 2019, which is a continuation of U.S. application Ser. No. 15/850,117, filed on Dec. 21, 2017, now U.S. Pat. No. 10,027,224, issued on Jul. 17, 2018, which is a continuation of U.S. application Ser. No. 15/126,073, filed on Sep. 14, 2016, now U.S. Pat. No. 9,887,662, issued on Feb. 6, 2018, which is the national phase under 35 USC 371 of International Application No. PCT/US2015/019860, filed on Mar. 11, 2015 which under 35 USC 119, claims the benefit of the Mar. 14, 2014 priority date of U.S. Provisional Application 61/953,303 and the Mar. 14, 2014 priority date of U.S. Provisional Application 61/953,270, the contents of which are herein incorporated by reference.

FIELD OF DISCLOSURE

This invention relates to power converters, and in particular, to charge pumps.

BACKGROUND

In many circuits, the power that is available to drive the circuit may not be in a form that the circuit demands. To correct this, it is useful to provide a power converter that converts the available power into a form that conforms to the circuit's requirements.

One common type of power converter is a switch-mode power converter. A switch-mode power converter produces an output voltage by switching reactive circuit elements into different electrical configurations using a switch network. A switched capacitor power converter is a type of switch-mode power converter that primarily utilizes capacitors to transfer energy. Such converters are called "charge pumps." The capacitors are called "pump capacitors."

In operation, a charge pump transitions from one pump-state to the next in a sequence of pump-states. Each pump-state is characterized by a residence time in which the charge pump remains in that pump-state, and transition times, in which the charge pump is between pump-states. The sum of the residence times for all pump-states and the intervening transition times between those pump-states is the period for one cycle of the charge pump.

For correct operation, each pump capacitor should begin and end each cycle with zero change in charge. If this is not the case, charge will accumulate on the pump capacitor over the course of several cycles in the case of positive non-zero change in charge. Since the voltage across a capacitor is linearly proportional to the charge, this charge accretion/depletion will cause the voltage across the pump capacitor to drift over time.

In many charge pumps, a switch connects adjacent pump capacitors. The voltage across the switch thus depends on the voltages across adjacent pump capacitors. If voltages across these capacitors drift unevenly, the voltage across the switch may exceed its rating. This may cause the switch to overheat, thus destroying the switch, and the charge pump as well.

Procedures for managing charge on a pump capacitor depend in part on how the charge got there. In general, there are two ways to put charge into a capacitor: using a voltage source, or using a current source.

When a voltage source is used, management of charge is relatively simple. The charge present at a capacitor is a linear function of the voltage. Thus, dropping the voltage to zero is sufficient to remove the charge from the capacitor.

When a current source is used, management of charge is not so simple. This is because the charge on a pump capacitor is related to an integral of the current, and not to the instantaneous value of current.

On Nov. 8, 2012, Patent Publication WO 2012/151466, which is incorporated herein by reference, made public configurations of charge pumps in which one terminal was connected to a regulator. Because of its inductor, and because of the relevant time scales associated with the switches involved, as far as these charge pump configurations are concerned, the regulator behaved like a current source. This made management of how much charge is in the pump capacitors more challenging.

SUMMARY

The inventive subject matter described herein relates to stabilizing a charge pump coupled with a current source or $|load|_{[DG1]}$ by ensuring that each pump capacitor of the charge pump begins a cycle in the same condition for every cycle. This avoids charge accretion that occurs when residual charge from the end of a first cycle is added to the beginning of a second cycle, thus causing the voltage of the capacitor to drift over time.

In one aspect, the invention features an apparatus for power conversion. Such an apparatus includes a switching network, and a charge management subsystem. The switching network controls interconnections between pump capacitors in a capacitor network that has a terminal coupled to a current source. In operation, the switching network causes the capacitor network to execute charge-pump operating cycles during each of which the capacitor network adopts different configurations in response to different configurations of the switching network. At the start of a first charge-pump operating cycle, each pump capacitor assumes a corresponding initial state. The charge-management subsystem restores each pump capacitor to the initial state by the start of a second charge-pump operating cycle that follows the first charge-pump operating cycle.

In some embodiments, a controller in the charge-management subsystem controls residence time. One such embodiment features a controller that controls a first residence time during which the switching network is in a first configuration. Another embodiment features a controller that controls a first residence time during which the switching network is in a first configuration, and a second residence time during which the switching network is in a second configuration. Also included are embodiments in which the controller causes the switching network to cause the capacitor network to assume a dead-time configuration.

In some embodiments, a cycle includes a first configuration and a second configuration, and a controller of the charge-management subsystem controls a second configuration of the switching network based on a result of having had the switching network assume the first configuration. In other embodiments, the switching network passes through a present cycle and at least one past cycle, and the controller controls the present cycle based at least in part on performance of the switching network during at least one of the past cycles. In yet other embodiments, the switching network passes through a present cycle after having passed through past cycles, and the charge-management subsystem includes a proportional-integral-derivative controller that controls the present cycle based at least in part on performance of the switching network during at least one of the past cycles.

Embodiments also include those in which the charge-management system includes a controller configured to exercise control over configurations of the switching network. Among these are embodiments in which the controller includes a feedback controller configured to control the different configurations of the switching network based on an output of the capacitor network, and those in which the controller includes a threshold-logic circuit controller configured to control the different configurations of the switching network based on an output of the capacitor network.

Yet other embodiments do not rely on controlling the switching network. In one such embodiment, the charge-management system includes a controller configured to exercise control over the current source to which the capacitor network is coupled. Among these embodiments are those in which the capacitor network has two terminals, one of which is a low-voltage terminal, and the terminal that is coupled to the current source is a low-voltage terminal. Also among these embodiments is the converse case, in which the capacitor network has two terminals, one of which is a high-voltage terminal, and the terminal that is coupled to the current source is a high-voltage terminal.

In some embodiments, the charge-management system includes a stabilizing capacitance connected to the current source.

Other embodiments include a trim-capacitor network that includes switches that are selectively configured to define an interconnection of one or more trim capacitors, thereby defining an aggregate capacitance that reduces a mismatch between the aggregate capacitance and a desired capacitance. In some of these embodiments, the desired capacitance is a stabilizing capacitance connected to the current source. In others, the desired capacitance is a desired capacitance of a pump capacitor.

Embodiments also include those in which the charge-pump operating cycle has a constant time duration, and those in which the charge-pump operating cycle has a variable time duration.

In some embodiments, the second charge-pump operating cycle that follows the first charge-pump operating cycle is a charge-pump cycle that immediately follows the first charge-pump operating cycle. However, in some cases, complete restoration cannot be done in one cycle. Thus, in certain embodiments, the second charge-pump operating cycle that follows the first charge-pump operating cycle is a charge-pump cycle that is separated from the first charge-pump operating cycle by at least one intervening charge-pump operating cycle.

The invention also includes embodiments that include the capacitor network that the switching network is configured to control.

Embodiments of the invention also include those in which the switching network causes execution of a charge pump operating cycle that consists of no more than two configurations during which transfer of charge between capacitors occurs, as well as those in which switching network causes execution of a charge pump operating cycle that consists of at least three configurations during which transfer of charge between capacitors occurs.

In some embodiments, the capacitor network and the switching network define a charge pump. Among these are embodiments in which the charge pump includes a multi-stage charge pump, embodiments in which the charge pump includes a cascade multiplier, embodiments in which the charge pump includes a multi-phase charge pump, and embodiments in which the charge pump includes a single-phase charge pump.

A variety of devices function as current sources within the meaning of the invention. One such device is a regulator. Among the regulators that function as current sources are switch-mode power converters, and buck converters.

In some embodiments, the charge management subsystem restores at least one of the pump capacitors to an initial state thereof at least in part by changing an amount of charge stored on the at least one pump capacitor. Among these embodiments are those in which the charge management subsystem changes an amount of charge stored one the pump capacitor by causing flow between that pump capacitor and a repository of charge. Suitable repositories include another pump capacitor or ground.

In another aspect, the invention features a method for controlling a charge pump. Such a method includes causing a charge-pump switching network to cause a network of pump capacitors to which the charge pump switching network is coupled to execute charge-pump operating cycles during each of which the network of pump capacitors adopts different configurations in response to different configurations of the switching network. At the start of a first charge-pump operating cycle, each pump capacitor assumes a corresponding initial state. The method then proceeds by restoring each pump capacitor to the initial state by the start of a second charge-pump operating cycle that follows the first charge-pump operating cycle.

In some practices, restoring each pump capacitor to the initial state includes restoring each pump capacitor to the initial state by the start of a second charge-pump operating cycle that immediately follows the first charge-pump operating cycle. However, there are also practices of the invention in which restoring each pump capacitor to the initial state includes restoring each pump capacitor to the initial state by the start of a second charge-pump operating cycle that is separated from the first charge-pump operating cycle by at least one charge-pump operating cycle.

Some practices restore each pump capacitor to the initial state by controlling residence time. One such practice includes controlling a first residence time during which the switching network is in a first configuration. However, in another practice, restoring each pump capacitor to the initial state includes controlling a first residence time during which the switching network is in a first configuration, and also controlling a second residence time during which the switching network is in a second configuration. Yet other practices include controlling residence times for additional configurations, some of which involve charge transfer and some of which do not. For example, in one practice, restoring each pump capacitor to the initial state includes causing the capacitor network to assume a dead-time configuration.

Practices also include those in which a cycle includes a first configuration and a second configuration, and restoring each pump capacitor to the initial state includes controlling a second configuration of the switching network based on a result of having had the switching network assume a first configuration.

In other practices, the switching network passes through a present cycle and at least one past cycle, and restoring each pump capacitor to the initial state includes controlling the present cycle based at least in part on performance of the switching network during the at least one past cycle.

In yet other practices, the switching network passes through a present cycle after having passed through past cycles, and restoring each pump capacitor to the initial state includes implementing proportional-integral-derivative control over the present cycle based at least in part on performance of the switching network during at least one of the past cycles.

Some practices of the invention are those in which restoring each pump capacitor to the initial state includes exercising control over configurations of the switching network. Among these are practices in which exercising control over configurations of the switching network includes exercising feedback control of the different configurations of the switching network based on an output of the capacitor network, and those in which exercising control over configurations of the switching network includes exercising threshold-logic control over the different configurations of the switching network based on an output of the capacitor network.

In yet other practices, restoration of each pump capacitor to the initial state includes exercising control over a current source to which the capacitor network is coupled. Among these practices are those that include exercising control over a current source that is coupled to a low-voltage terminal, and those that include exercising control over a current source that is coupled to a high-voltage terminal.

Yet other practices are those in which restoring each pump capacitor to the initial state includes connecting a stabilizing capacitance connected to the current source.

Other practices include those in which restoring each pump capacitor to the initial state includes interconnecting one or more trim capacitors to define an aggregate capacitance that minimizes an error between the aggregate capacitance and a desired capacitance. Examples of a desired capacitance include a desired capacitance of a stabilizing capacitor connected to a current source, and a desired capacitance of a pump capacitor.

In other practices, causing a charge-pump switching network to cause a network of pump capacitors to which the charge pump switching network is coupled to execute charge-pump operating cycles includes causing execution of charge-pump operating cycles having a constant time duration. However, in other practices, the time duration is variable.

Some practices feature starting the second charge-pump operating cycle that follows the first charge-pump operating cycle immediately after finishing the first charge-pump operating cycle. However, in other practices, starting the second charge-pump operating cycle that follows the first charge-pump operating cycle occurs only after having finished at least one intervening charge-pump operating cycle.

In some practices, causing a charge-pump switching network to cause a network of pump capacitors to which the charge pump switching network is coupled to execute charge-pump operating cycles includes causing execution of a charge pump operating cycle that consists of no more than two configurations during which transfer of charge between capacitors occurs. However, in others, this is carried out instead by causing execution of a charge pump operating cycle that consists of at least three configurations during which transfer of charge between capacitors occurs.

Certain practices include forming a charge pump by combining the capacitor network and the switching network. Among these are practices in which the charge pump thus formed is a multi-stage charge pump. However, other charge pumps, such as a cascade multiplier, a multi-phase charge pump, or a single-phase charge pump, can also be formed.

In some practices, exercising control over a current source to which the capacitor network is coupled includes exercising control over a regulator. This can include exercising control over many different kinds of regulators, all of which effectively function as current sources. Such regulators include switch-mode power converters, and buck converters.

Other practices are those in which restoring each pump capacitor to the initial state includes restoring at least one of the pump capacitors to an initial state thereof at least in part by changing an amount of charge stored on the at least one pump capacitor. Practices of this kind can include causing flow between the at least one pump capacitor and a repository of charge. Examples of a suitable repository include another pump capacitor, or ground.

One effect of using a current-based load (or source) with a charge pump is that there may be situations when fixed switch timing used with current-based loads and/or sources results in charge imbalance across capacitors. Such imbalance can result in (or can co-occur with) larger than necessary ripple, extremes in voltage and/or current internal to or at terminals of the charge pump, drift in average and/or peak voltages internal or at terminals of the charge pump, and/or instability, which may be manifested by growing amplitude of voltage variation between points internal to and/or terminals of the charge pump.

In another aspect, in general, an approach to avoiding and/or mitigating the effects related to charge imbalance is by adjusting the switch timing in a feedback arrangement. In some examples, a pattern of switch timing is adapted based on electrical measurements at the terminals and/or internal to the charge pump. In some examples, the instants of transition of switch states are determined by such electrical measurements.

These and other features of the invention will be apparent from the following detailed description, and the accompanying drawings, in which:

DETAILED DESCRIPTION

Figure 1:
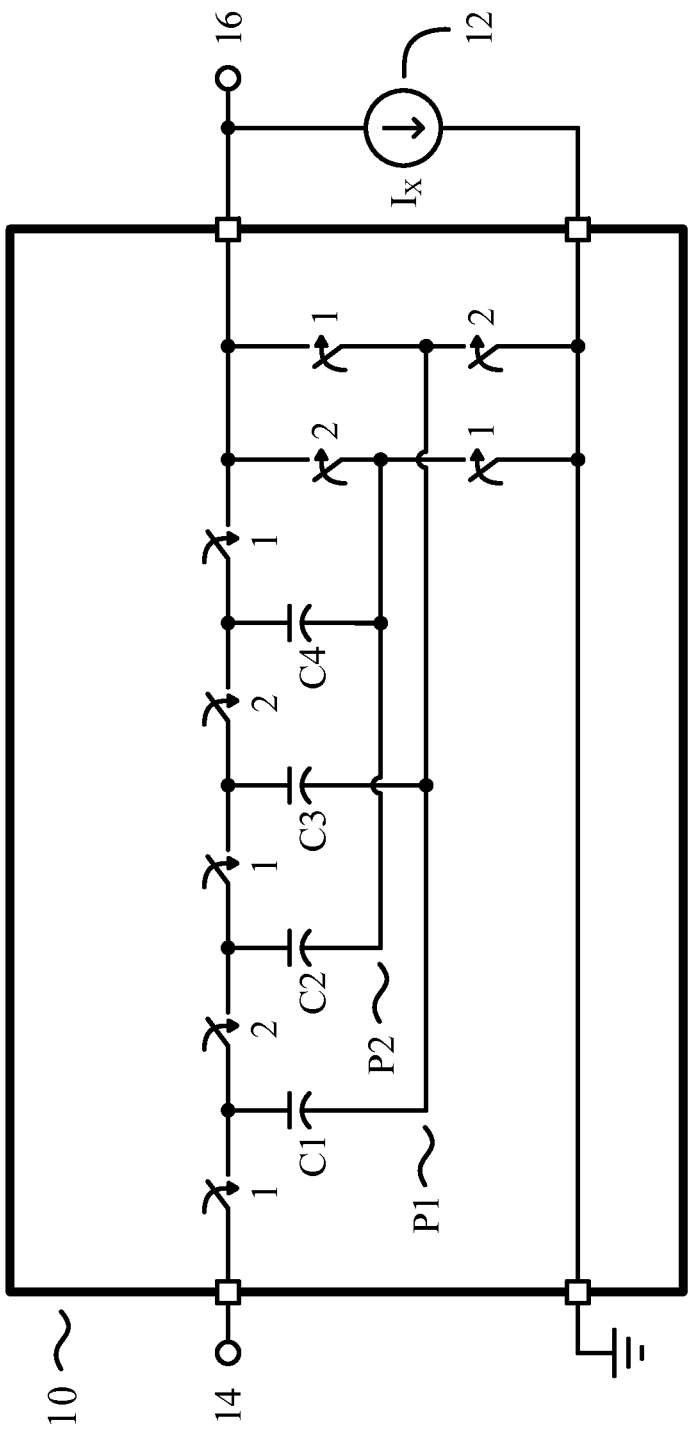
FIG. 1 shows a single-phase charge pump.

FIG. 1 shows a first example of a charge pump 10 coupled to a load 12 that is modeled as an ideal current source. The charge pump 10 is a multi-stage charge pump, also known as a cascade multiplier. Although the current shown is actually being drawn from the charge pump 10, this distinction amounts to a mere sign change. The important feature of a current source is that it relentlessly drives a constant flow of current.

Throughout this specification, reference will be made to a "current source." As is well known, an ideal "current source" is an abstraction used for circuit analysis that does not in fact exist. However, for the time scales of interest, there are a variety of devices that effectively function as a current source. Examples include regulators, such as linear regulators, DC motors, depending on the load, and an IDAC, which is an active circuit that sets the current through LEDs. Thus, throughout this specification, "current source" or "current load" is understood to mean real devices, including but not limited to those enumerated herein, that effectively function as a current source.

The load 12 can be viewed as a non-zero constant current, or a pulsed current that alternates between two values, one of which can be zero. Charge transfer occurs whenever the current at the load is non-zero. When the current is non-zero and constant, the charge transfer will be referred to as "soft charging," or "adiabatic charging."

The charge pump 10 has first and second terminals 14, 16. One terminal is a high voltage that carries a low current. The other terminal is a low voltage that carries a high current. In the particular example described herein, the second terminal 16 is the low voltage terminal. However, in other embodiments, the second terminal 16 is the high voltage terminal.

Between the terminals 14, 16 are four identical pump capacitors: outer pump capacitors C1, C4 and inner pump capacitors C2, C3. A first phase-node P1 couples with the negative terminal of the first and third pump capacitors C1, C3, and a second phase-node P2 couples with the negative terminal of the second and fourth pump capacitors C2, C4.

Figure 2:
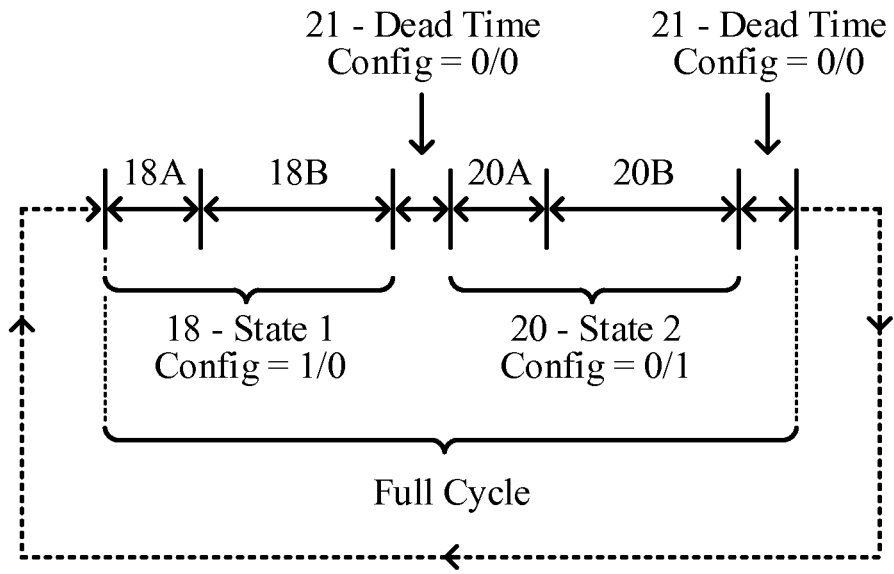
FIG. 2 shows a time-line associated with the operation of the single-phase charge pump of FIG. 1.

A first switch-set 1 and a second switch-set 2 cooperate to cause the charge pump 10 to reconfigure the pump capacitors C1-C4 between first and second pump-states 18, 20 as shown in FIG. 2. Through operation of the first and second switch-sets 1, 2, the charge pump 10 maintains a transformation ratio M:N between the voltages at the first and second terminals 14, 16. In the particular charge pump 10 shown in FIG. 1, the transformation ratio is 5:1.

In operation, the charge pump 10 executes a series of charge pump cycles. Each charge pump cycle has a first pump-state 18 and a second pump-state 20, as shown in FIG. 2. To transition from the first pump-state 18 to the second pump-state 20, the switches in the first switch-set 1 are opened and the switches in the second switch-set 2 are closed. Conversely, to transition from the second pump-state 20 into the first pump-state 18, the switches in the first switch-set 1 are closed and the switches in the second switch-set 2 are opened.

FIG. 2 shows the configuration of the switches as "Config X/Y" where X and Y are binary variables that indicate the disposition of the switches in the first and second switch-sets 1, 2 respectively. A binary zero indicates that the switches in a particular switch-set are open and a binary one indicates that the switches in a particular switch-set are closed.

During the first pump-state 18, the switches in the first switch-set 1 are all closed and the switches in the second switch-set 2 are all opened. The first pump-state 18 consists of a first pump-state redistribution interval 18A and a first pump-state steady-state interval 18B.

The first pump-state 18 begins with the opening of the switches in the second switch-set 2 and the closing of the switches in the first switch-set 1. This begins a first pump-state redistribution interval 18A characterized by a rapid redistribution of charge. For a brief period, the current associated with this charge distribution dwarfs that associated with the current through the load 12.

Eventually, the current associated with charge redistribution dies down and the charge pump 10 settles into a first pump-state steady-state interval 18B. During the first pump-state steady-state interval 18B, current through the charge pump 10 is dominated by the current through the load 12. The sum of the time spent in the first pump-state steady-state interval 18B and the first pump-state redistribution interval 18A is the first residence time.

During the second pump-state 20, the switches in the first switch-set 1 are all opened and the switches in the second switch-set 2 are all closed. The second pump-state 20 consists of a second pump-state redistribution interval 20A and a second pump-state steady-state interval 20B.

The second pump-state 20 begins with the closing of the switches in the second switch-set 2 and the opening of the switches in the first switch-set 1. This begins a second pump-state redistribution interval 20A characterized by a rapid redistribution of charge. For a brief period, the current associated with this charge distribution dwarfs that associated with the current through the load 12.

Eventually, the current associated with charge redistribution dies down and the charge pump 10 settles into a second pump-state steady-state interval 20B. During the second pump-state steady-state interval 20B, current through the charge pump 10 is once again dominated by the current through the load 12. The sum of the time spent in the second pump-state steady-state interval 20B and the second pump-state redistribution interval 20A is the second residence time.

In the course of transitioning between the first and second pump-states 18, 20 the voltage at the first phase-node P1 alternates between ground and the voltage at the second terminal 16. Meanwhile, the voltage at the second phase-node P2 is 180 degrees out-of-phase with the first phase-node P1.

Between the first pump-state 18 and the second pump-state 20 there is a dead-time interval 21 during which both the switches in the first switch-set 1 and the switches in the second switch-set 2 are open. Although not, in principle, required, this dead-time interval is a practical necessity because switches do not transition instantaneously. Thus, it is necessary to provide a margin to avoid the undesirable result of having switches in the first and second switch-sets 1, 2 closed at the same time.

Figure 3:
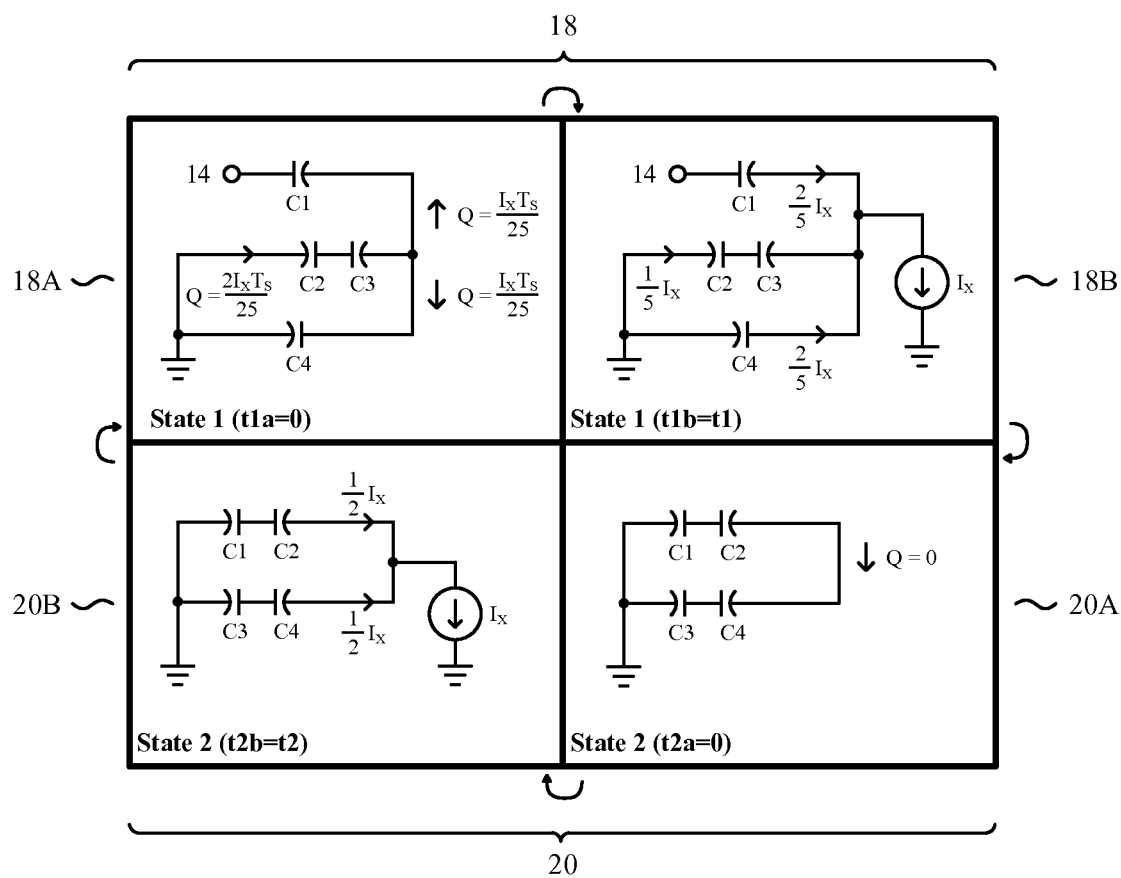
FIG. 3 shows circuit configurations associated with a cycle of the single-phase charge pump of FIG. 1.

To avoid having to introduce complexity that would only obscure understanding of the principles of operation, FIG. 3 shows currents passing through the pump capacitors C1-C4 in both the first and second pump-states 18, 20 assuming instantaneous charge-redistribution, no dead-time, and the same non-zero current, $I_X$, at the second terminal 16 in both pump-states.

In FIG. 3, the time spent in the first pump-state redistribution interval 18A is t1$a$; the time spent in the first pump-state steady-state interval 18B is t1$b$; the time spent in the second pump-state redistribution interval 20A is t2$a$; and the time spent in the second pump-state steady-state interval 20B is t2$b$. Lastly, the total length of one cycle is tsw. The first residence time is therefore t1$a$+t1$b$; and the second residence time is t2$a$+t2$b$. The assumption of instantaneous charge redistribution is manifested by setting t1$a$ and t2$a$ to zero, resulting in tsw being equal to t1$b$+t2$b$.

During the first pump-state steady-state interval 18B, the outer pump capacitors C1, C4 carry a current having a magnitude of $0.4I_X$ while the inner pump capacitors C2, C3 carry a current having half of the magnitude carried by the outer pump capacitors C1, C4. This is because the inner pump capacitors C2, C3 are in series and the outer pump capacitors C1, C4 are by themselves.

During the second pump-state steady-state interval 20B, each outer pump capacitor C1, C4 is placed in series with one of the inner pump capacitors C2, C3, respectively. As a result, each pump capacitor C1-C4 carries a current with magnitude $0.5I_X$. Note that the inner pump capacitors C2, C3 are always in series with another pump capacitor, whereas the outer pump capacitors C1, C4 are only in series with another pump capacitor during one pump-state.

In the limiting case where charge is redistributed instantly, the current sources can be removed during the first and second pump-state redistribution intervals 18A, 20A as in FIG. 3. The amount of charge that is redistributed depends upon the voltages across the pump capacitors C1-C4 prior to a pump-state change.

In general, it is desirable that the net charge change at any pump capacitor C1-C4 be zero during the course of a particular cycle. Otherwise, increasing/decreasing amounts of charge will collect in the pump capacitors C1-C4 over several cycles. This charge accretion/depletion over multiple cycles causes instability.

Since the quantity of charge transferred is the product of current and the amount of time the current flows, it follows that one can control the quantity of charge transferred to a pump capacitor C1-C4 in any portion of the cycle by controlling the amount of time that the charge pump 10 spends in that portion of the cycle. This provides a way to ensure that the net charge change at each pump capacitor C1-C4 is zero during one cycle of the charge pump 10.

If the above constraint is applied to each distinct capacitor current in a charge pump 10, it is possible to generate a system of linear equations in which the times spent in each pump-state are the unknowns. The solution to that system will be the residence times for each pump-state 18, 20 that avoid instability.

To avoid instability in this example, assuming instantaneous charge redistribution, the first residence time should be ⅗·tsw and the second residence time should be ⅖·tsw. This results in an equal amount of charge being transferred from inner pump capacitors C2, C3 to the first pump capacitor C1 and to the fourth pump capacitor C4 during the first pump-state redistribution interval 18A; and zero redistribution charge during the second pump-state redistribution interval 20A.

Solutions for various transformation ratios M:N are shown below in tabular form:

| M:N | First residence time (sec) | Second residence Time (sec) |
| --- | --- | --- |
| 3:1 | 2/3 · tsw | 1/3 · tsw |
| 4:1 | 1/2 · tsw | 1/2 · tsw |
| 5:1 | 3/5 · tsw | 2/5 · tsw |
| 6:1 | 1/2 · tsw | 1/2 · tsw |
| 7:1 | 4/7 · tsw | 3/7 · tsw |
| 8:1 | 1/2 · tsw | 1/2 · tsw |
| 9:1 | 5/9 · tsw | 4/9 · tsw |

Although there is no guarantee that every topology will have a solution, in the case of charge pumps like that in FIG. 1, a solution exists. As a result of symmetry in current flow during the first and second pump-state redistribution intervals 18A, 20A, the solution for cases in which the transformation ratio is 2k:1 for a positive integer k, the first and second residence times will be equal. Additionally, when M is odd and N is 1, the first residence time is tsw·(M+1)/2M while the second residence time is tsw·(M−1)/2M.

Figure 4:
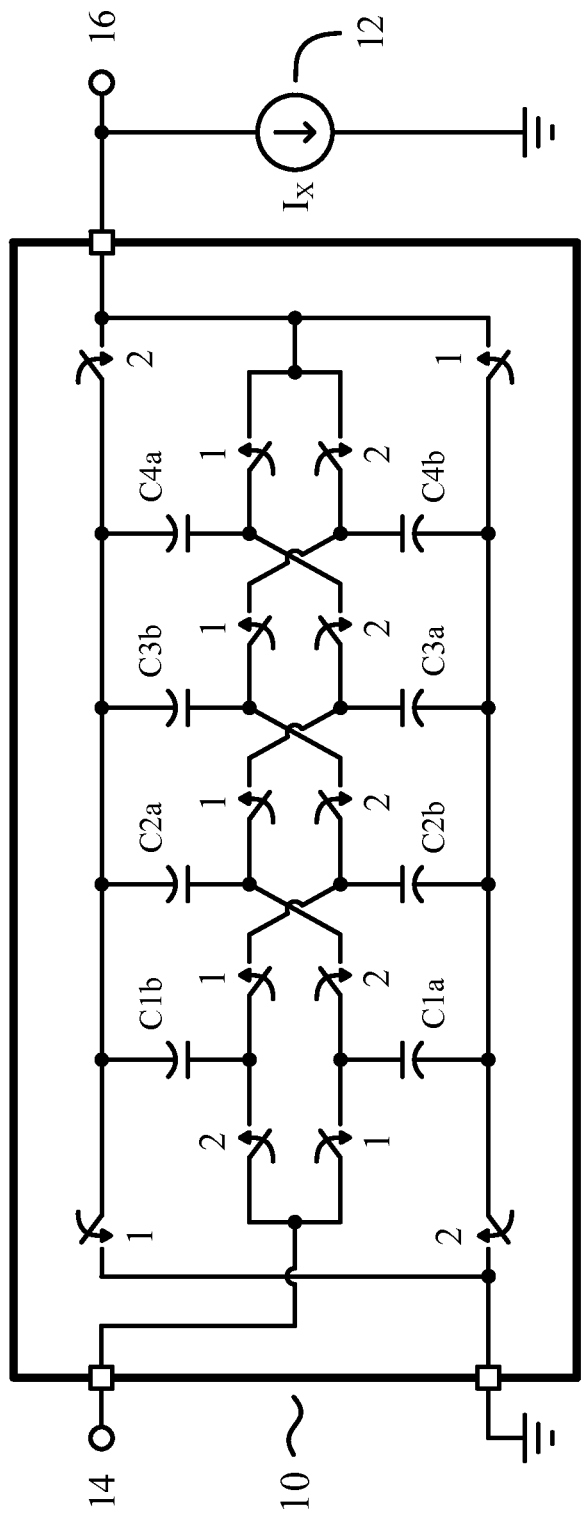
FIG. 4 shows a two-phase charge pump.
Figure 5:
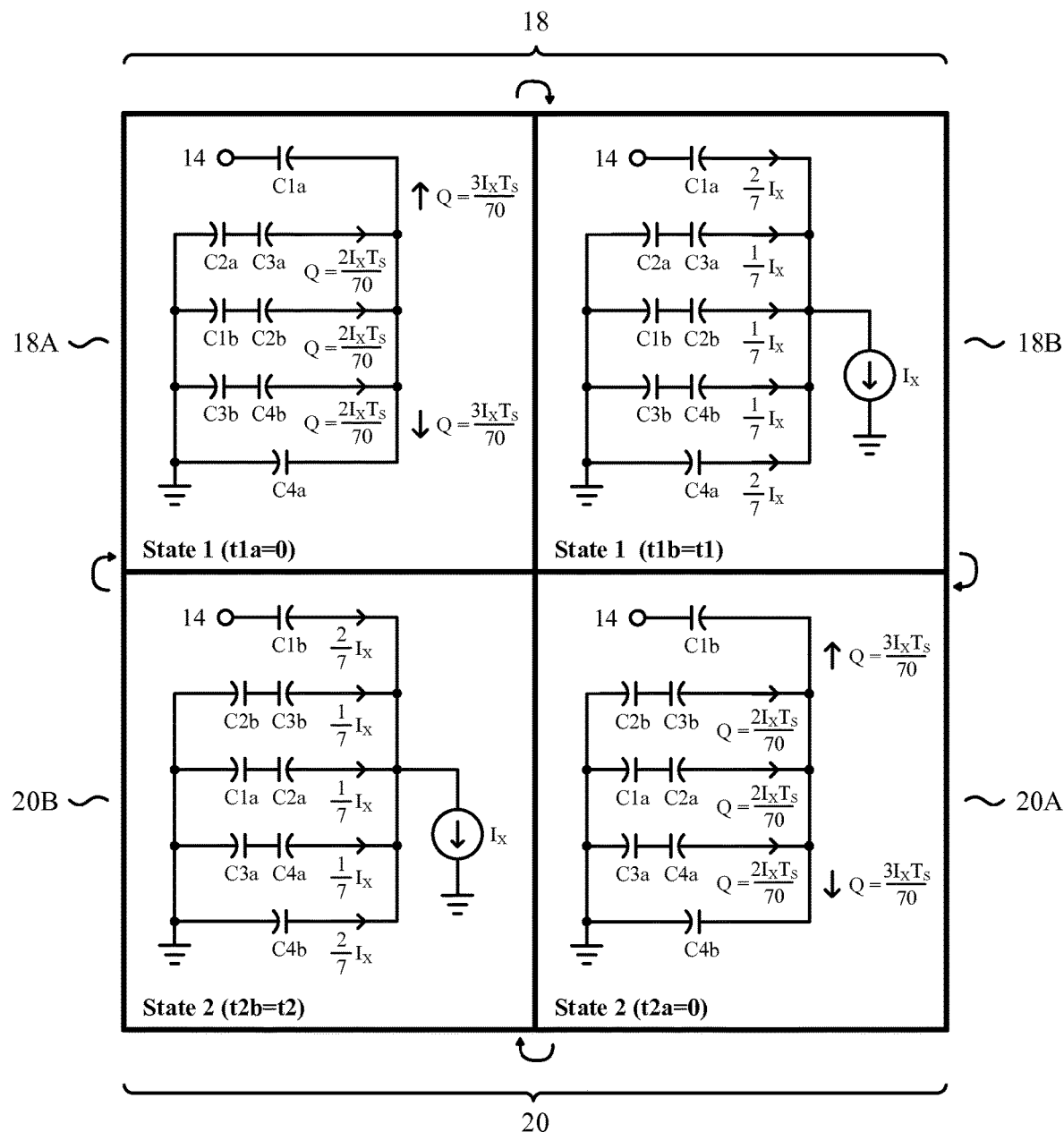
FIG. 5 shows circuit configurations associated with a cycle of the two-phase charge pump of FIG. 4.

In the case of a two-phase charge pump 10, such as that shown in FIG. 4, the currents in the first and second pump-state redistribution intervals 18A, 20A are inherently symmetric, as shown in FIG. 5. Hence, the first and second pump-state residence times are equal, unlike in the single-phase charge pump 10 shown in FIG. 1, even though both charge pumps have the same transformation ratio M:N.

In general, the first and second pump-state residence times, in the case of charge pumps like that in FIG. 4, will be equal for any transformation ratio k:1, where k is a positive integer. This inherent symmetry provides two-phase charge pumps with an advantage over single-phase charge pumps when it comes to stability.

However, analysis based on principles of linear circuit theory is based on an idealization of the circuit. In practice, for example, due to differences in the capacitances of the various pump capacitors C1-C4 of FIG. 1, difference in circuit resistances, (e.g., through transistor switches and/or signal traces), or inexact timing of the pump-state durations, it can be difficult to manage charge accretion/depletion in the pump capacitors C1-C4.

Figure 6:
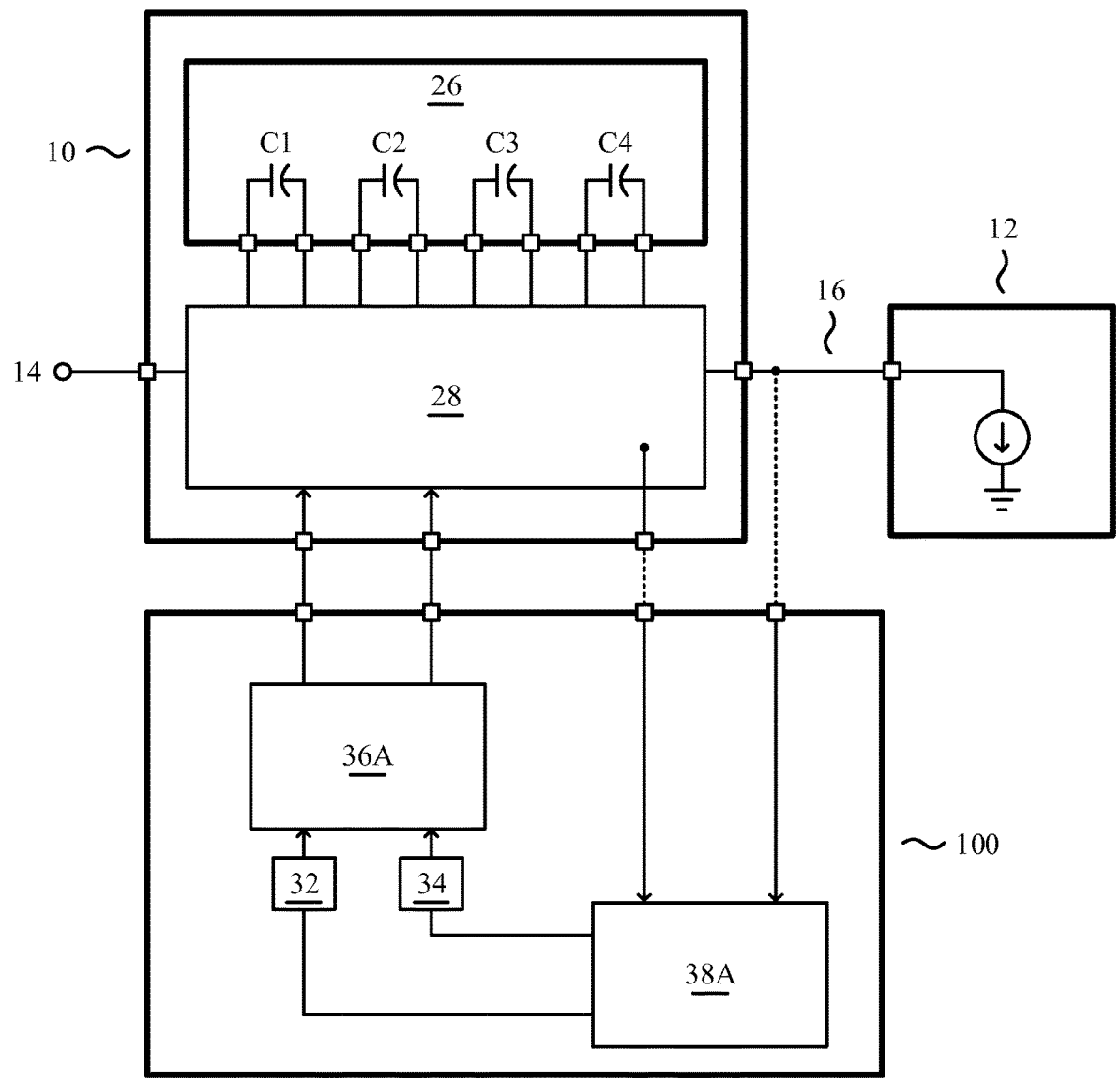
FIG. 6 shows a first controller for controlling pump-state residence times in the charge pump of FIG. 1.

One method for managing charge accretion/depletion is to use feedback to control the residence times. FIG. 6 shows an apparatus to carry out such control.

For convenience in discussion, FIG. 6 shows the charge pump 10 as divided into a capacitor array 26 and a switch circuit 28. The capacitor array 26 includes the pump capacitors C1-C4 and the switch circuit 28 includes the first and second switch-sets 1, 2.

A first controller 100 identifies suitable residence times for each pump-state and stores those in first and second residence-time buffers 32, 34. At appropriate times, a first timing circuit 36A, which includes a clock to keep time, reads the residence-time buffers 32, 34 and causes the switches in the switch circuit 28 to transition at appropriate times.

To determine the correct values of the residence times, the first controller 100 includes a first feedback circuit 38A. In general, a feedback circuit will have a measured variable, and a manipulated variable that is to be manipulated in response to the measured variable in an effort to achieve some set point. For the first feedback circuit 38A, the manipulated variable is the pair of residence times, and the measured variable includes a voltage measured at the second terminal 16. Optionally, the measured variable for the first feedback circuit 38A includes measurements obtained from within the charge pump 10, hence the dotted lines within FIG. 6. Examples of such measurements include voltages across the switches in the first and second switch-sets 1, 2 or across pump capacitors C1-C4.

In one embodiment, the first feedback circuit 38A determines residence time values based on measurements taken over a sequence of cycles. The manipulated variable of the first controller 100 is chosen based on historical values. A suitable first controller 100 is a PID (proportional-integral-derivative) controller.

An advantage of the first controller 100 shown in FIG. 6 is that the frequency of the charge pump 10 is fixed. Another embodiment, shown in FIG. 7, features a second controller 101 that is configured to determine residence time values based on measurements obtained during the current cycle only. This allows residence time values to be determined on a cycle-by-cycle basis. As a result, the cycle length of the charge pump 10 can vary when using the second controller 101.

The second controller 101 includes a second timing circuit 36B that is similar to first timing circuit 36A described in FIG. 6. However, the second feedback circuit 38B is implemented as a threshold logic circuit that relies on comparing voltages.

A second timing circuit 36B provides state control signals to the switch circuit 28. During normal operation, the second timing circuit 36B causes transitions between the first and second pump-states 18, 20 using nominal first and second residence times. The nominal residence times can be based on circuit analysis assuming ideal circuit elements.

The second timing circuit 36B also includes first and second skew inputs 44, 46 to receive corresponding first and second skew signals 48, 50 from the second feedback circuit 38B. The second feedback circuit 38B asserts one of the first and second skew signals 48, 50 to prematurely force the charge pump 10 to change pump-states. The second feedback circuit 38B makes the decision to assert one of the first and second skew signals 48, 50 based on feedback from one or more sources. This feedback includes measurements of electrical parameters made at one or more of: the first terminal 14, the second terminal 16, inside the switch circuit 28, and inside the capacitor array 26.

If the second feedback circuit 38B does not assert either skew signal 48, 50, then the second timing circuit 36B causes the charge pump 10 to transition between its first and second pump-states 18, 20 according to the nominal first and second residence times. If, while the charge pump 10 is in the first pump-state 18, the second feedback circuit 38B presents an asserted first skew signal 48 to the first skew input 44, the second timing circuit 36B immediately causes the charge pump 10 to transition from the first pump-state 18 to the second pump-state 20. Conversely, if the second feedback circuit 38B presents an asserted second skew signal 50 to the second skew input 46 while the charge pump 10 is in the second pump-state 20, the second timing circuit 36B immediately causes the charge pump 10 to transition from the second pump-state 20 to the first pump-state 18.

An advantage of the second controller 101 is that it reacts immediately on a cycle-by-cycle basis. This means that the capacitors inside the capacitor array 26 can be stabilized faster. In fact, since the second controller 101 operates by prematurely terminating charge pump-states 18, 20, the notion of a frequency is not well defined.

Note that shortening the first residence time while keeping the second residence time constant will generally result in an upward drift and/or a reduction in the amplitude of a lower excursion of output voltage ripple. Therefore, in one example, when the second feedback circuit 38B detects either a downward drift in the average output or an excessive lower excursion of the output ripple, it presents an asserted first skew signal 48 to the first skew input 44, thus truncating the first pump-state 18 and shortening the first residence time.

Conversely, in another example, upon detecting an upward drift and/or an excessive upward excursion of the ripple, the second feedback circuit 38B presents an asserted second skew signal 50 to the second skew input 46, thereby truncating the second pump-state 20 and shortening the second residence time.

As noted above, the second feedback circuit 38B receives measurements of electrical parameters from one or more locations. However, these measurements would be meaningless without some way for the second feedback circuit 38B to know whether the measured values are normal or not. To remedy this, it is desirable to provide expected values of these electrical parameters.

The thresholds provided to the second feedback circuit 38B can be derived in many ways. One way is through analysis of an ideal circuit corresponding to the charge pump 10. Another way is through simulation of a physical charge pump 10. Either of these techniques can be used to provide expected values for an average output voltage (e.g., as a multiple of the input voltage) and expected maximum and minimum values of output voltage ripple about that average. The second feedback circuit 38B uses such pre-computed values in setting the thresholds at which the skew signals 48, 50 are asserted. Similar logic can be used to implement the first feedback circuit 38A discussed in connection with FIG. 6. FIG. 8 shows an implementation of the second feedback circuit 38B shown in FIG. 7 that limits the peaks not valleys. The illustrated feedback circuit 38B uses first and second peak-detectors to sense the peak voltage at the second terminal 16 during the first and second pump-states 18, 20 respectively. The first peak-detector comprises a first voltage-buffer and a first diode D1. The second peak-detector comprises a second voltage-buffer and a second diode D2. The first peak-detector stores the peak voltage during the first pump-state 18 in a first peak-storage capacitor C1. The second peak-detector stores the peak voltage during the second pump-state 20 in a second peak-storage capacitor C2.

The stored peak voltages on the first and second peak-storage capacitors C1, C2 can then be connected to the inputs of corresponding first and second peak-voltage comparators by closing first and second switches S1a, S2a simultaneously. This compares the peak voltages that were stored on the first and second peak-storage capacitors C1, C2 during the preceding first and second pump-states 18, 20.

If the peak voltage during the first pump-state 18 exceeded that of the second pump-state 20 by a first threshold V1, then the first peak-voltage comparator asserts the first skew signal 48. Conversely if the peak voltage during the second pump-state 20 exceeded that of the first pump-state 18 by a second threshold V2, then the second peak-voltage comparator asserts the second skew signal 50.

Figure 9:
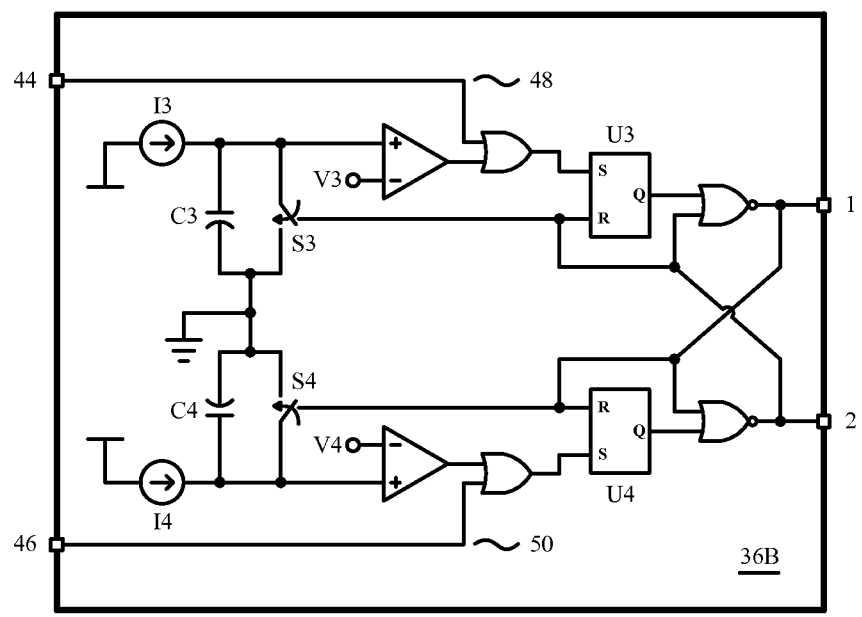
FIG. 9 shows an implementation of the second timing circuit in FIG. 7.

The first and second skew signals 48, 50 from the second feedback circuit 38B make their way to the second timing circuit 36B, an implementation of which is shown in FIG. 9. The second timing circuit 36B uses these first and second skew signals 48, 50 to generate non-overlapping signals that control the first and second switch-sets 1, 2. In the illustrated embodiment, there is no gap between the two pump-states 18, 20. The first pump-state 18 starts upon a transition from the second pump-state 20, and vice-versa.

In operation, the circuit shown in FIG. 9 begins the first pump-state 18 by closing a first switch S4. This resets a first timing-capacitor C4 to be low. Meanwhile, a first SR latch U4 is in the reset state. During the first pump-state 18, an open second switch S3 allows a first bias-current 13 to charge a second timing-capacitor C3. Eventually, the first bias-current 13 will have deposited enough charge in the second timing-capacitor C3 to raise its voltage beyond a first voltage-threshold V3 at the input of a first voltage comparator. When this happens, the first voltage comparator outputs a logical high. This, in turn, sets a second SR latch U3, thus terminating the first pump-state 18. Thus, in the absence of an asserted first skew signal 48, the residence time of the first pump-state 18 depends upon the first bias-current 13, the capacitance of the second timing-capacitor C3, and the first voltage-threshold V3.

Upon terminating the first pump-state 18, the second pump-state 20 begins. The operation during the second pump-state 20 is similar to that described above for the first pump-state 18.

At the start of the second pump-state 20, the first switch S4 opens, thus allowing a second bias-current 14 to charge the first timing-capacitor C4. Eventually, the second bias-current 14 will have deposited enough charge in the first timing-capacitor C4 to raise its voltage past a second voltage-threshold V4 at the input of a second voltage comparator. In response to this, the second voltage comparator outputs a logical high that sets the first SR latch U4, thus terminating the second pump-state 20. During the second pump-state 20, the second timing-capacitor C3 is reset low when the second switch S3 is closed, and the second SR latch U3 is in the reset state. In the absence of an asserted second skew signal 50, the residence time of the second pump-state 20 is set by the second bias-current 14, the capacitance of the first timing-capacitor C4, and the second voltage-threshold V4.

The first skew signal 48 and the output of the first voltage comparator are inputs to a first OR-gate. Thus, the first pump-state 18 can be terminated in two ways. In the first way, already described above, the first pump-state 18 lasts for its nominal residence time and terminates once enough charge has accumulated in the second timing-capacitor C3. However, while the second timing-capacitor C3 is still being filled with charge, the second feedback circuit 38B may assert the first skew signal 48, thus bringing the first pump-state 18 to a premature end.

It will be apparent from the symmetry of the circuit shown in FIG. 9 that the second pump-state 20 can be truncated in the same way by assertion of the second skew signal 50. The second feedback circuit 38B is thus able to shorten the first residence time relative to the second by asserting the first skew signal 48 but not the second skew signal 50.

After each comparison of the peak voltage in the first and second pump-states 18, 20, the first and second peak-storage capacitors C1, C2 of the second feedback circuit 38B are reset by closing third and fourth switches S1*b*, S2*b* and opening the first and second switches S1*a*, S2*a*. Also, the voltage buffers that sense the voltage at the second terminal 16 can be disabled or tri-stated while the first and second peak-storage capacitors C1, C2 are reset. Each sample-compare-reset cycle can occur once per charge pump cycle or once per set of multiple consecutive charge pump cycles.

In the methods described above, there have been only two pump-states 18, 20 and two residence times. However, the principles described are not limited to merely two pump-states 18, 20. For example, it is possible to implement a dead time interval during which the charge pump 10 is not doing anything. This dead time interval can be used in connection with the embodiment described in FIG. 7 to cause fixed frequency operation. To do so, the dead time interval is set to be the difference between a nominal charge pump period and the sum of the first and second pump-state intervals.

Figure 10:
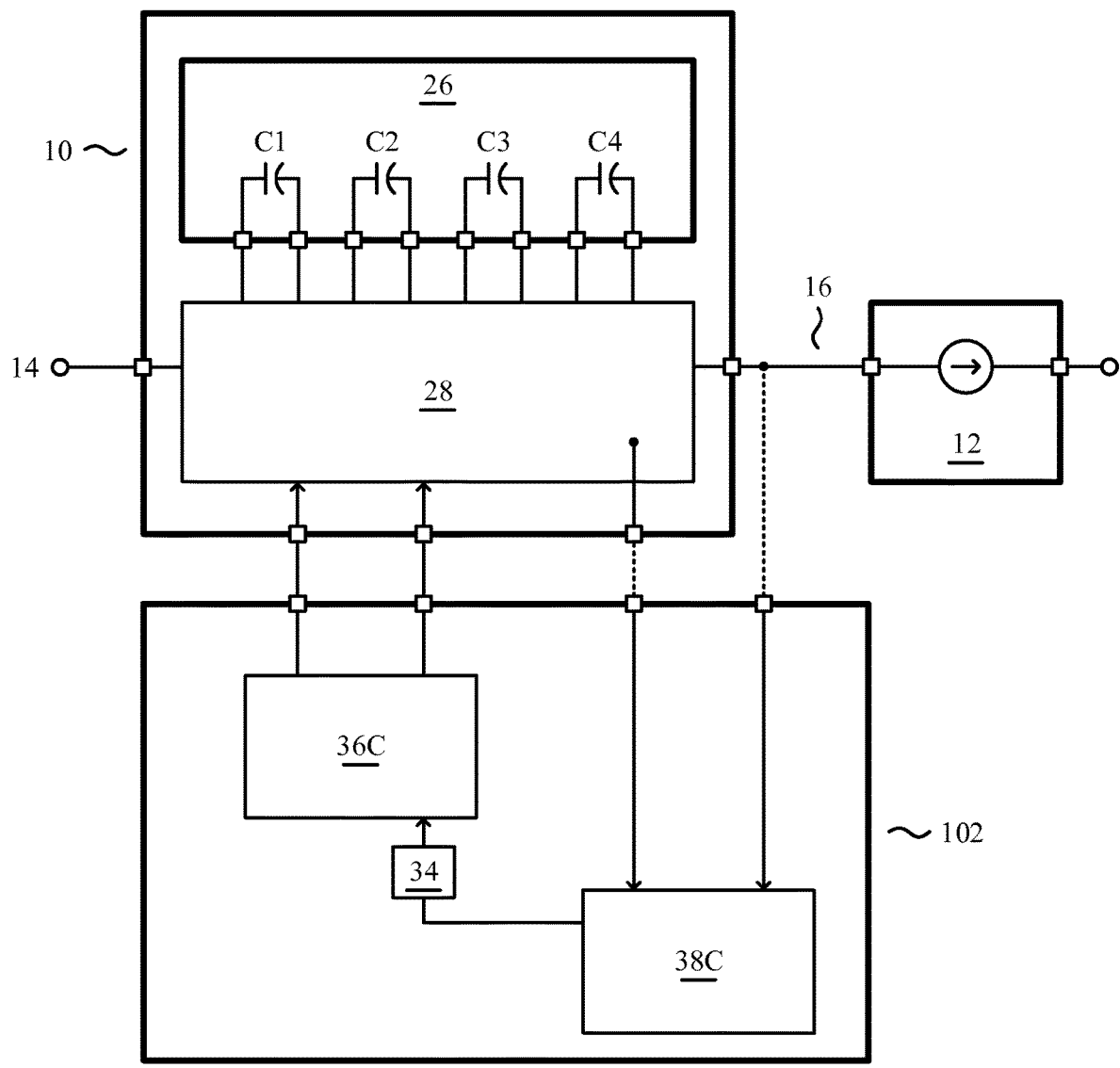
FIG. 10 shows a third controller for controlling pump-state residence times in the charge pump of FIG. 1

FIG. 10 shows one implementation for carrying out a three-state charge pump that defines a dead time as its third state. The embodiment shown in FIG. 10, features a third controller 102 that uses a third feedback circuit 38C connected to a third timing circuit 36C to exercise control over only a second residence time in the second residence-time buffer 34, and not the first residence time. In this embodiment, the first residence time is always set to some nominal value. The third controller 102 features an input from the switch circuit 28 that provides information on the state of the first switch-set 1. Based on this information, if the third controller 102 determines that the switches in the first switch-set 1 are open, it has two choices. The first choice is to close the switches in the second switch-set 2. This initiates the second residence time. The second choice is to leave the switches in the second switch-set 2 open. This initiates a dead-time interval. For proper operation, the first and second residence times must be non-zero.

The dead-time interval is an example of a third pump-state in which no charge transfer occurs. However, it is also possible to operate a charge pump in three or more states, each one of which permits charge transfer between capacitors. An example of such multi-state charge pump control is given in U.S. Provisional Application 61/953,270, in particular, beginning on page 11 thereof, the contents of which are herein incorporated by reference.

The rate at which charge accumulates on a capacitor depends on the current and the amount of time the current is allowed to flow. The methods disclosed thus far manage charge accumulation by controlling the second of these two parameters: the amount of time current is allowed to flow. However, it is also possible to control the first of these two parameters, namely the amount of current that flows. Embodiments that carry out this procedure are shown in FIGS. 11 and 12.

Figure 7:
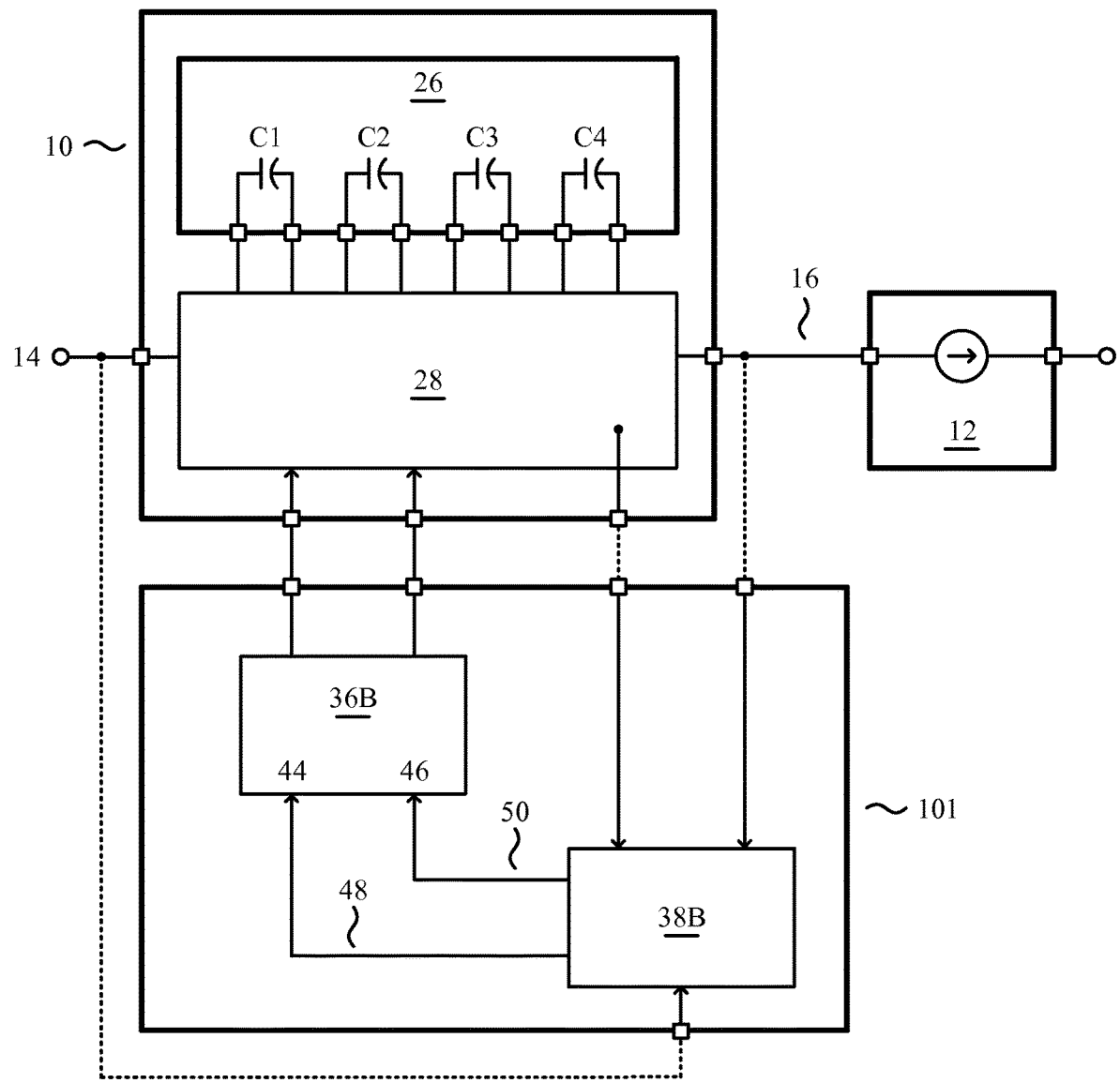
FIG. 7 shows a second controller for controlling pump-state residence times in the charge pump of FIG. 1.
Figure 8:
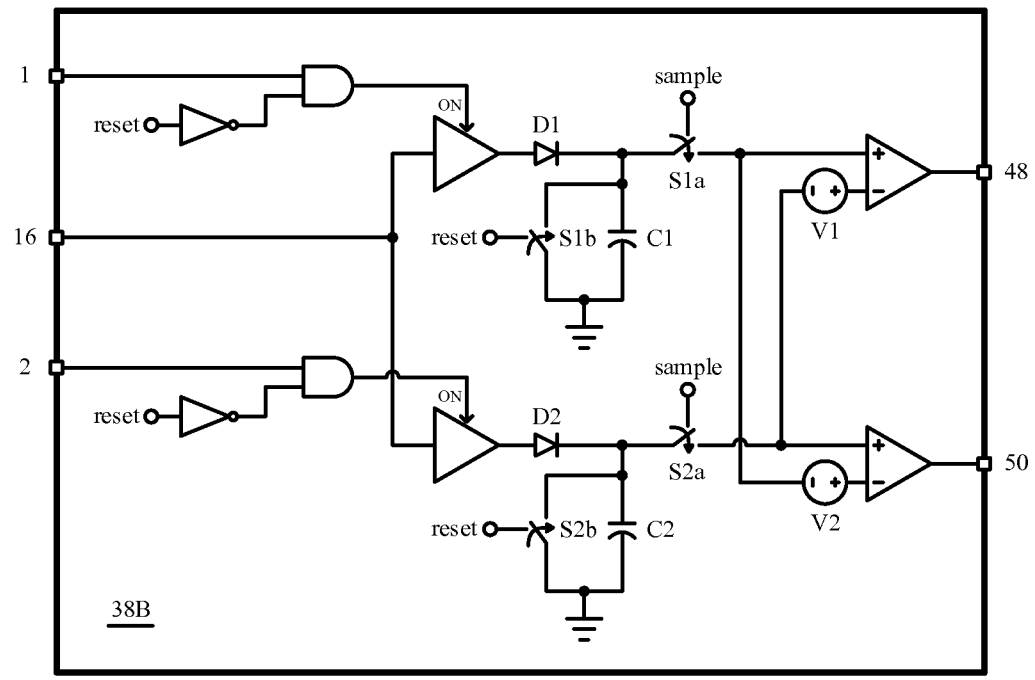
FIG. 8 shows an implementation of the second feedback circuit in FIG. 7.
Figure 11:
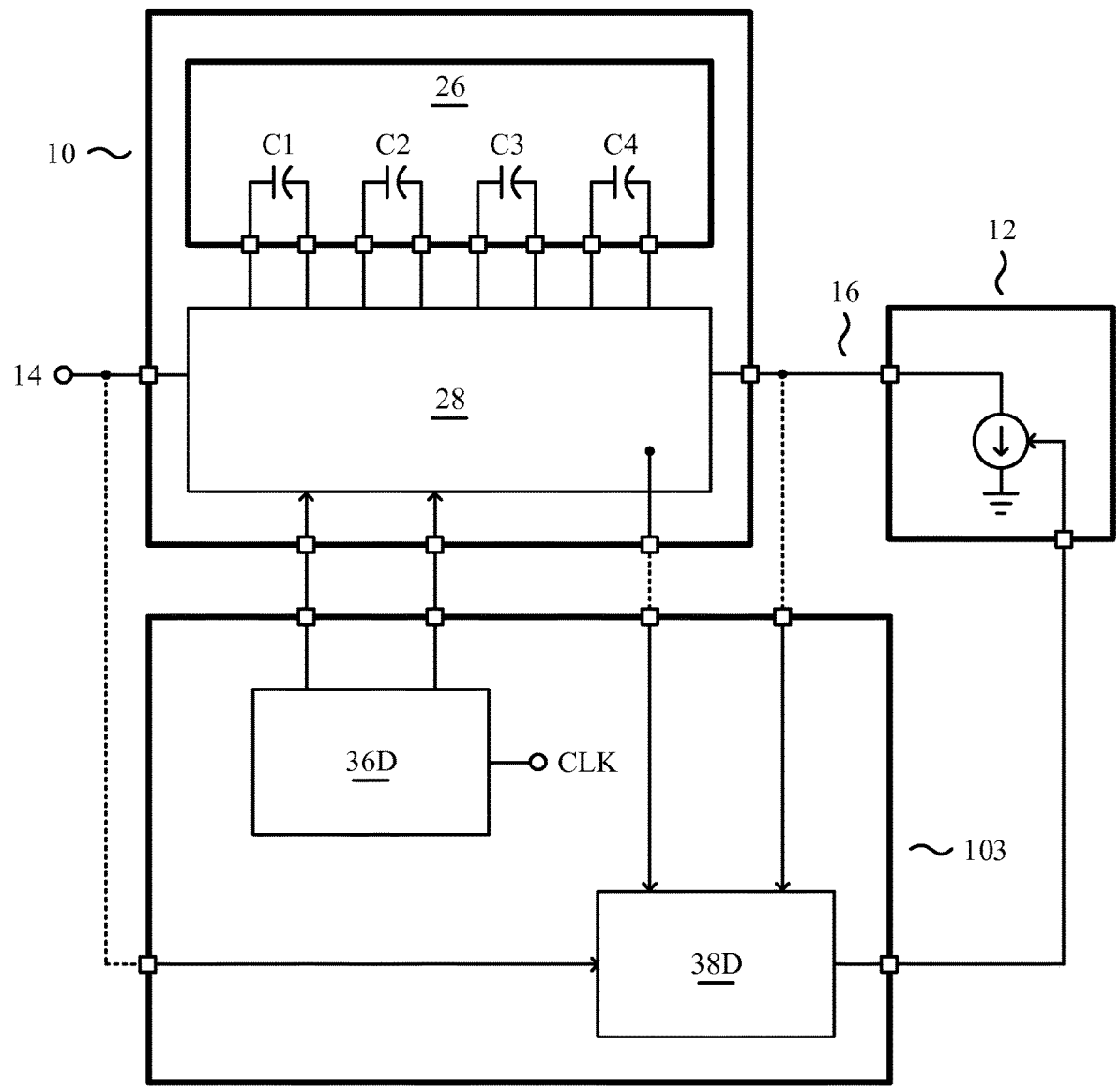
FIG. 11 shows a fourth controller for controlling current at a load.

FIG. 11 shows a fourth controller 103 similar to the second controller 101 shown in FIG. 7 but with no connection between a fourth feedback circuit 38D and a fourth timing circuit 36D. Thus, unlike the second controller 101, the fourth controller 103 does not vary the first and second residence times. Instead, the fourth feedback circuit 38D of the fourth controller 103 adjusts the current drawn by the load 12, such as an IDAC within a LED driver, while allowing the first and second residence intervals to be derived from a constant clock signal CLK. The fourth feedback circuit 38D makes the decision on an extent to which to vary the current drawn by the load 12 based on feedback measurements from one or more sources. These include measurements of electrical parameters made at one or more of the first terminal 14, the second terminal 16, inside the switch circuit 28, and inside the capacitor array 26.

Figure 12:
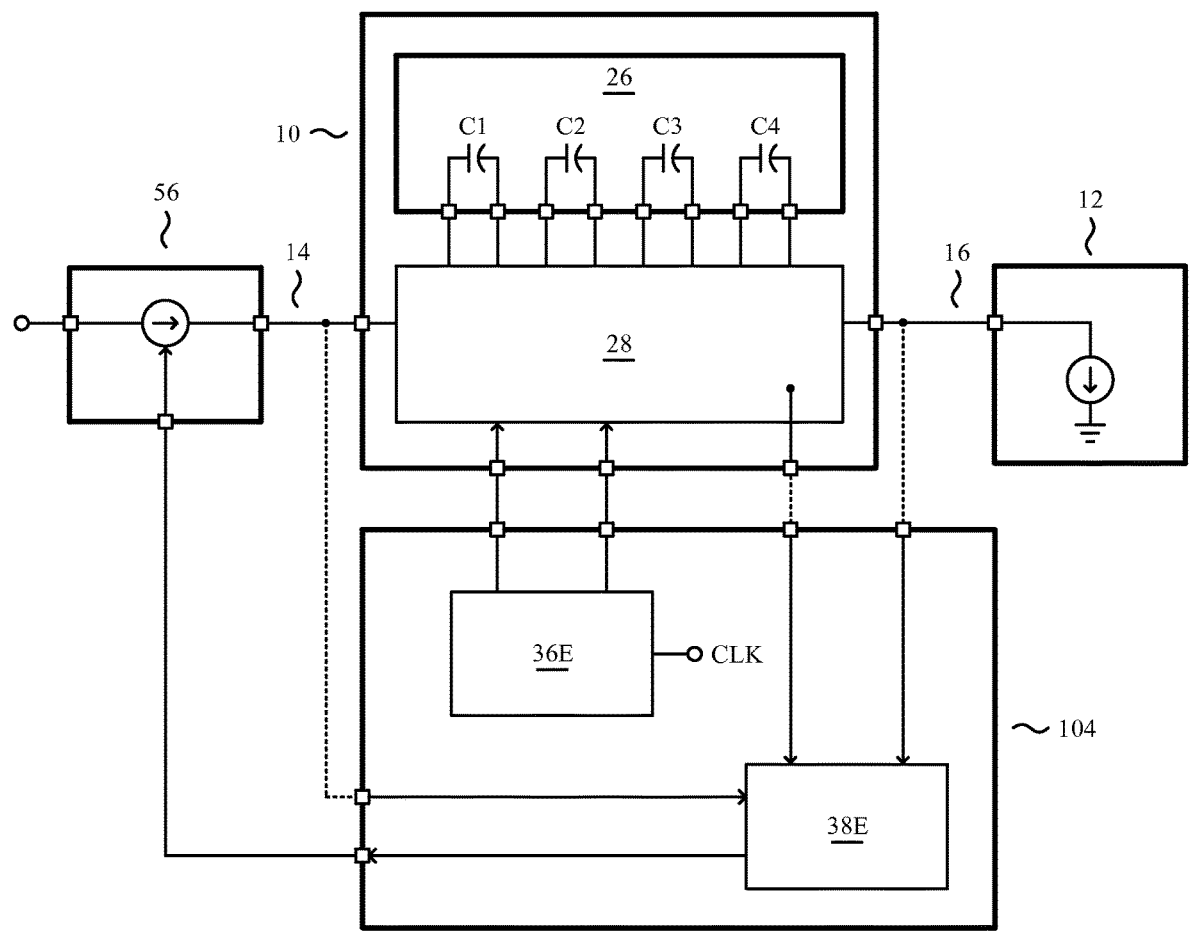
FIG. 12 shows a fifth controller for controlling current at a regulator.

FIG. 12 shows a fifth controller 104 that is similar to the fourth controller 103 except that instead of controlling current drawn by a load 12, the fifth controller 104 controls current through a regulator 56, which is modeled in the illustrated circuit as a current source. In the fifth controller 104, a fifth timing circuit 36E responds only to a clock signal CLK. A fifth feedback circuit 38E decides how much to vary the current through the regulator 56 based on feedback measurements from one or more sources. These include measurements of electrical parameters made at one or more of the first terminal 14, the second terminal 16, inside the switch circuit 28, and inside the capacitor array 26.

The control methods described above are not mutually exclusive. As such, it is possible to implement hybrid controllers that implement two or more of the control methods described above.

Figure 13:
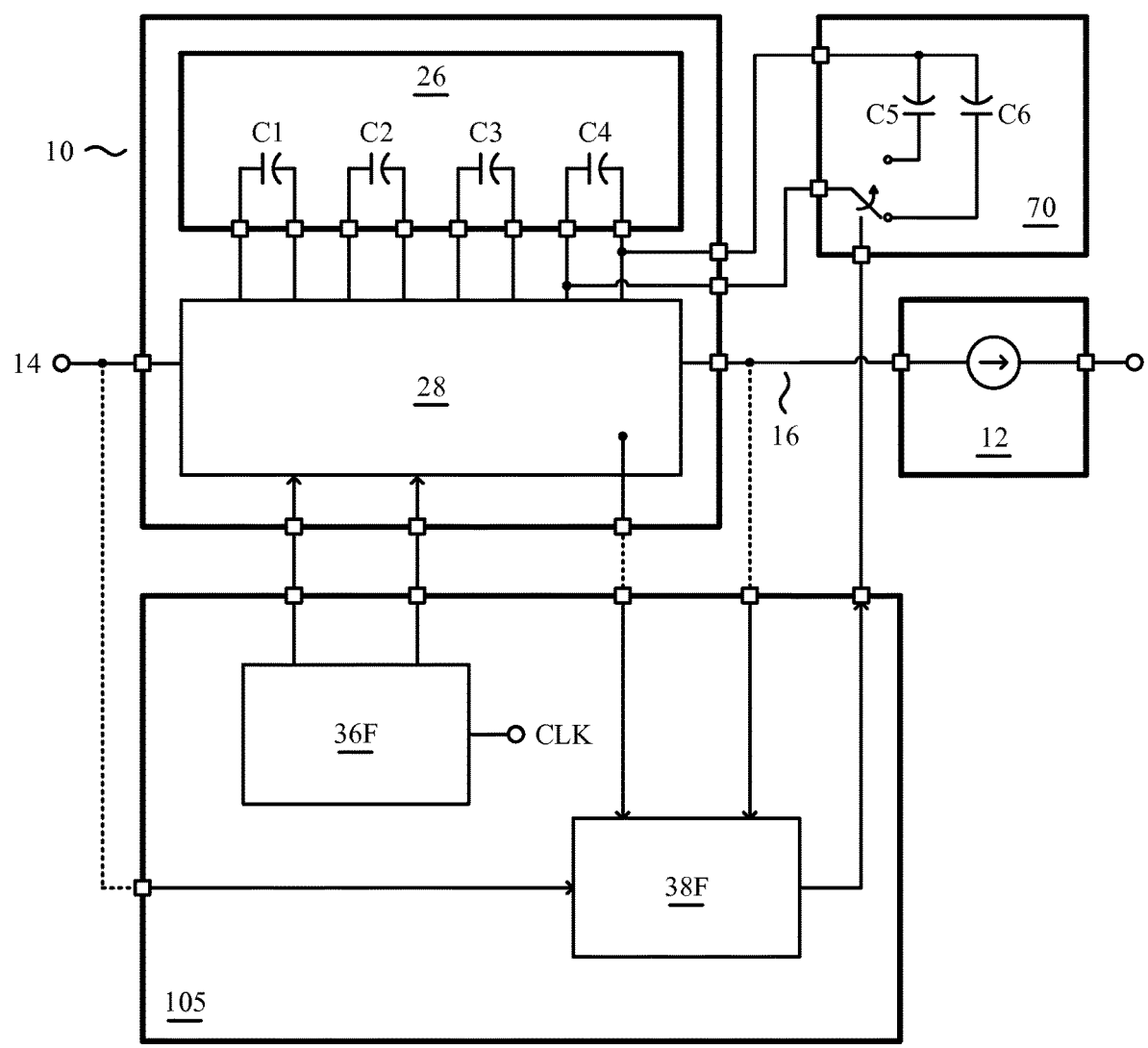
FIG. 13 shows a switching network for attaining a desired capacitance for a pump capacitor in FIG. 1.

One reason that charge accretion/depletion becomes a problem is that, as a practical matter, it is next to impossible to manufacture pump capacitors C1-C4 that all have the same desired capacitance. Referring now to FIG. 13, a remedy for this is to compensate for an error in the value of a pump capacitor's capacitance by switching other capacitors in series or in parallel with that pump capacitor. These capacitors are referred to as "trim" capacitors because they trim a capacitance to a desired value. The term "trim" is not be construed as "reducing" but rather in the sense of making fine adjustments in any direction in an effort to attain a desired value. Capacitance of a pump capacitor can be raised or lowered by connecting another capacitor in parallel or in series respectively.

FIG. 13 shows a trim-capacitor network 70 having two trim capacitors C5, C6, either one of which can be placed in parallel with the fourth pump capacitor C4. Although only two trim capacitors C5, C6 are shown, a practical trim-capacitor network 70 has an assortment of capacitors with various values that can be selectively switched in series or in parallel with the fourth pump capacitor C4. The illustrated trim-capacitor network 70 is shown connecting one trim capacitor C6 in parallel with the pump capacitor C4, thus raising the effective capacitance of the combination. Only two trim capacitors C5, C6 are shown for clarity. However, it is a simple matter to add more, thus allowing greater variability in adjustment. In addition, for the sake of simplicity, the trim-capacitor network 70 shown only places trim capacitors C5, C6 in parallel. However, it is a relatively simple matter to design a circuit to switch trim capacitors C5, C6 in series with the fourth pump capacitor C4. Additionally, in FIG. 13, a trim-capacitor network 70 is shown only for the fourth pump capacitor C4. In practice, each pump capacitor C1-C4 would have its own trim-capacitor network 70.

By switching in the proper combination of trim capacitors in the trim-capacitor network 70, the overall capacitance of the pump capacitor C4 combined with that of the trim capacitors C5, C6 can be made to approach or even equal a target value. This trimming procedure may only need to be carried out once in the lifetime of the charge pump 10 or can be carried out during normal operation because the capacitance of practical capacitors normally vary with the voltage across their terminals as well as temperature.

Rather than being used once to adjust for manufacturing errors, a trim-capacitor network 70 as shown can also be used during operation of the circuit as a way to control the quantity of charge on a particular pump capacitor C4 by transferring charge between a particular capacitor, e.g. the pump capacitor C4, and some other charge repository, such as a trim capacitor C5, C6 within the trim-capacitor network 70, or to the ultimate repository, which is ground. This provides an alternative way to adjust the charge on each capacitor in an effort to restore all pump capacitors to their respective initial voltages at the start of a charge pump cycle.

Alternately, a current sink could be coupled to each pump capacitor C1-C4 allowing it to bleed any excess charge to another location or multiple locations, such as the first terminal 14, the second terminal 16, a terminal inside the switch circuit 28, a terminal inside the capacitor array 26, and even ground.

Figure 14:
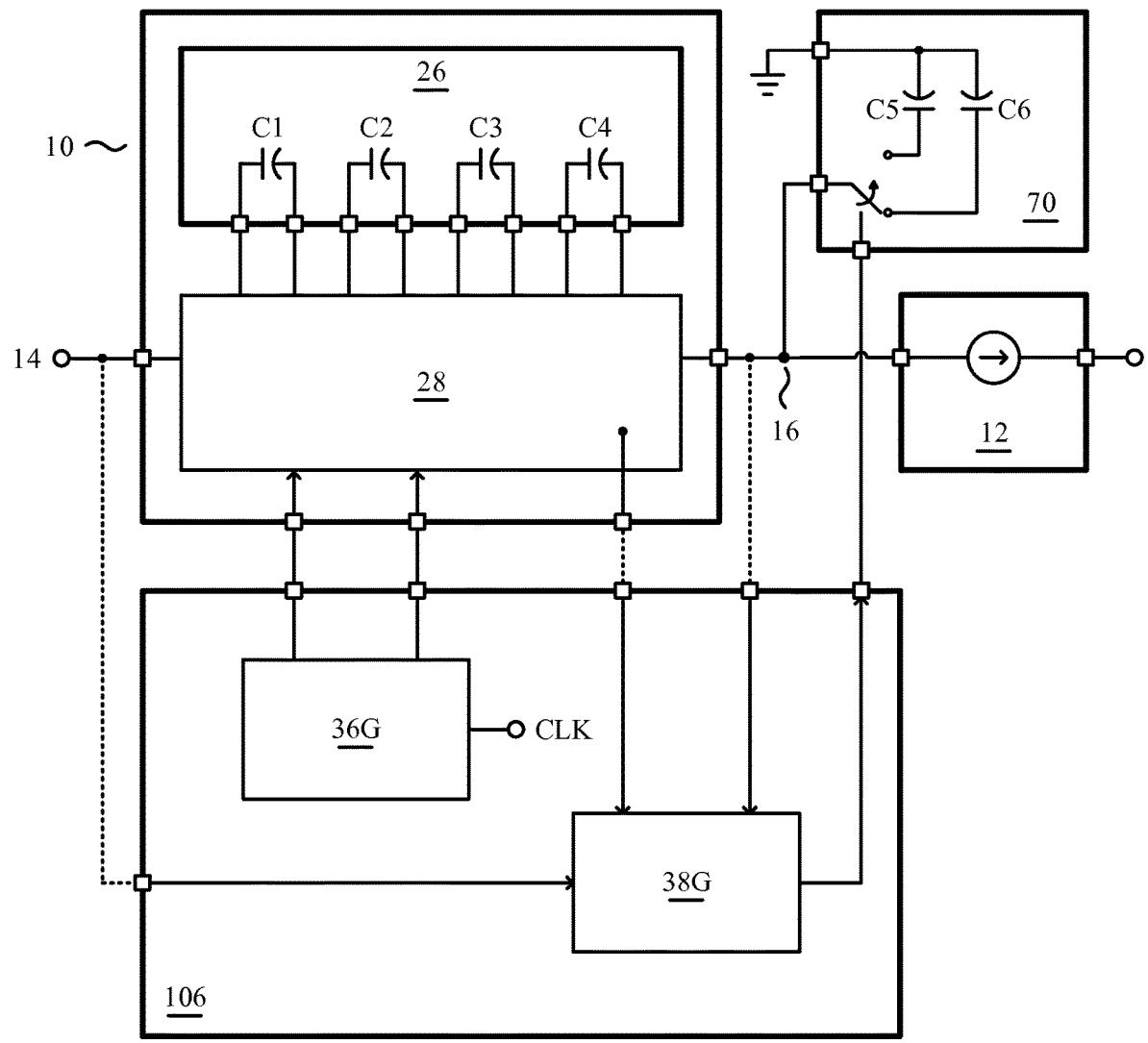
FIG. 14 shows a switching network for attaining a desired stabilization capacitance.

Another use for the trim-capacitor network 70, shown in FIG. 14, is to act as a stabilizing capacitance between the charge pump 10 and the load 12. To reduce losses, the stabilizing capacitance is preferably just sufficient to stabilize the charge pump 10. A larger stabilizing capacitance value than necessary may increase power loss during charge pump operation. Because of manufacturing tolerances, it will, in general, not be possible to either predict the required value of the stabilizing capacitance or, even if a prediction were available, to ensure that it has the required value over all operating conditions. Thus, one can use a technique similar to that described in connection with FIG. 13 to switch a selected trim capacitor C5, C6 from the trim-capacitor network to act as a stabilizing capacitance.

The charge pump 10 can be implemented using many different charge pump topologies such as Ladder, Dickson, Series-Parallel, Fibonacci, and Doubler. Similarly, suitable converters for the regulator 56 and for the load 12 when implemented as a regulator include: Buck converters, Boost converters, Buck-Boost converters, non-inverting Buck-Boost converters, Cuk converters, SEPIC converters, resonant converters, multi-level converters, Flyback converters, Forward converters, and Full Bridge converters.

Having described the invention, and a preferred embodiment thereof, what is claimed as new, and secured by Letters Patent is:

1. An apparatus to convert a first voltage into a second voltage, the apparatus comprising:
a power converter having an input and an output ports, the power converter comprising a charge pump to implement one or more operating cycles, the charge pump to comprise a first and a second nodes;
a clock to generate a clock signal; and
a controller to generate one or more control signals based, at least in part, on the clock signal to control a plurality of switches to facilitate one or more transitions between a first and a second pump states, the first and the second pump states to comprise a full operating cycle of the one or more operating cycles,
the charge pump to comprise a plurality of pump capacitors coupled along a charge transfer path to at least some of the plurality of switches between the first and the second nodes of the charge pump, the second node of the charge pump to be coupled a circuit comprising a current source,
wherein the controller to control at least one switch of the plurality of switches so as to adjust a current to be drawn by the circuit based, at least in part, on at least one measurement obtained at the second node to facilitate maintaining an average output voltage of the power converter substantially at a level of the second voltage.

2. The apparatus of claim 1, wherein the plurality of pump capacitors to have a first charge during the first pump state and a second charge during the second pump state.

3. The apparatus of claim 2, wherein the controller to control the plurality of switches in a manner so as to implement the second pump state with the plurality of pump capacitors having the second charge to be substantially equal to the first charge.

4. The apparatus of claim 1, wherein the first pump state is to follow the second pump state.

5. The apparatus of claim 1, wherein the circuit to comprise a load.

6. The apparatus of claim 1, wherein the circuit to comprise a regulator.

7. The apparatus of claim 1, wherein the controller to control a first residence time, a second residence, a combination thereof.

8. The apparatus of claim 7, wherein the first residence time to include a redistribution interval and a steady state interval of the first pump state, and the second residence time to include a redistribution interval and a steady state interval of the second pump state.

9. The apparatus of claim 1, wherein the controller to implement a deadtime interval between the first and the second pump states.

10. The apparatus of claim 1, wherein the circuit to comprise at least one of the following: a buck converter; a boost converter; a buck-boost converter; a Cuk converter; a SEPIC converter; a resonant converter; a multi-level converter; a flyback converter; a forward converter; and/or a full bridge converter.

11. An apparatus comprising:
a clock to generate one or more clock signals;
a power converter having a controller, the controller to control at least a deadtime interval based, at least in part, on the clock signals; and
a first circuit to be coupled to a second circuit at a terminal thereof, the second circuit to control a rate of change in electrical charge to flow between the first and second circuits,
wherein the first circuit to comprise a plurality of switches operable by the controller to facilitate a plurality of pump capacitors cycling through a set of cycles, a particular cycle of the sets of cycles to arrange the plurality of pump capacitors into a particular arrangement of a sequence of arrangements, and
wherein, at the beginning of a subsequent cycle to occur after the particular cycle of the set of cycles, at least one of the pump capacitors is to be charged to a state of charge to be substantially the same as a state of charge to which the at least one pump capacitor was charged at the beginning of the first cycle.

12. The apparatus of claim 11, wherein the controller to control the sequence of arrangements based, at least in part, on an output of the first circuit.

13. The apparatus of claim 11, wherein the particular cycle to comprise a first and a second arrangements of the pump capacitors, and wherein the controller to controls the second arrangement based, at least in part, on a measurement obtained from the first arrangement.

14. The apparatus of claim 11, and further comprising a capacitor network comprising the plurality of pump capacitors, the capacitor network to be coupled to the switching network in a manner to allow the controller to control arrangements of the capacitor network.

15. The apparatus of claim 11, wherein the second circuit to comprise a current source.

16. An apparatus comprising:
a controller and a switching network to be coupled to a plurality of capacitors, the controller to generate one or more control signals to control the switching network to execute one or more cycles, a particular cycle of the one or more cycles to comprise particular arrangements of capacitors;
wherein the plurality of capacitors to comprise a first capacitor to begin a first cycle of the one or more cycles with a first value of charge,
wherein, with the first capacitor in the first cycle, charge redistribution to occur between the first capacitor and at least one other capacitor in the plurality of capacitors, and
wherein the first capacitor to begin a second cycle of the one or more cycles with a second value of charge to be substantially equal to the first value of charge based, at least in part, on the charge redistribution, the charge redistribution to be implemented, at least in part, in connection with charging and discharging of the first capacitor and the at least one other capacitor in the plurality of capacitors.

17. The apparatus of claim 16, wherein the first value of charge is equal to zero.

18. The apparatus of claim 16, wherein the discharging of the first capacitor to be implemented following the charge redistribution.

19. The apparatus of claim 16, wherein the controller to control to charge accretion and charge depletion in at least one capacitor of the plurality of capacitors during the first and second cycles.

20. The apparatus of claim 16, wherein the switching network to comprise a cascade multiplier.

* * * * *